US012669165B1

(12) United States Patent     (10) Patent No.:   US 12,669,165 B1

Iurlaro et al.     (45) Date of Patent:    Jun. 30, 2026

(54) TURBOFAN ENGINE INCLUDING A DOUBLE GEARBOX ASSEMBLY HAVING A DOUBLE GEARBOX ENGINE PARAMETER

(71) Applicants: GE Avio S.r.l., Rivalta di Torino (IT); GE Aviation Czech s.r.o., Prague (CZ)

(72) Inventors: Simone Iurlaro, Turin (IT); Juraj Hrubec, Prague (CZ); Michele Gravina, Milan (IT); Andrea Piazza, Turin (IT); Leonardo Coviello, Bari (IT); Daniele Pampalone, Turin (IT)

(73) Assignees: GE AVIATION CZECH S.R.O., Rivalta di Torino (IT); GE AVIO S.R.L., Prague (CZ)

( * ) Notice: Subject to any disclaimer, the term of this patent is extended or adjusted under 35 U.S.C. 154(b) by 0 days.

(21) Appl. No.: 19/295,009

(22) Filed: Aug. 8, 2025

(30)      Foreign Application Priority Data

Mar. 24, 2025    (IT) ........................ 102025000005967

(51) Int. Cl.
   *F16H 1/28*        (2006.01)
   *F02K 3/02*        (2006.01)

(52) U.S. Cl.
   CPC .............. *F16H 1/28* (2013.01); *F02K 3/025* (2013.01); *F05D 2220/36* (2013.01); *F05D 2240/60* (2013.01); *F16H 2001/289* (2013.01)

(58) Field of Classification Search
   CPC ...... F16H 1/28; F16H 2001/289; F02K 3/025; F05D 2220/36
   See application file for complete search history.

(56)        References Cited

U.S. PATENT DOCUMENTS 8,517,672 B2 *   8/2013   McCooey ................. F02K 3/06
                                               415/124.2
11,591,972 B2     2/2023   Beck et al.
                 (Continued)

FOREIGN PATENT DOCUMENTS

EP        4127437 B1     1/2025
FR        3127024 A1     3/2023
                 (Continued)

OTHER PUBLICATIONS

Antcliff et al., "Mission Analysis and Aircraft Sizing of a Hybrid-Electric Regional Aircraft," Conference Paper Presented at American Institute of Aeronautics and Astronautics, p. 1-16 (2016).

*Primary Examiner* — Derek D Knight
(74) *Attorney, Agent, or Firm* — Venable LLP; Peter T. Hrubiec; Michele V. Frank

(57)          ABSTRACT

A turbofan engine includes a turbo-engine, a fan, and a double gearbox assembly. The turbo-engine includes a compressor section, a turbine section, and a combustor in fluid communication with the compressor section and the turbine section. The turbine section includes a low-pressure turbine having a low-pressure shaft and a plurality of low-pressure turbine stages. The fan has a fan shaft drivingly coupled to the low-pressure shaft through the double gearbox assembly. The double gearbox assembly includes a first stage gear assembly coupled to the low-pressure shaft and an interstage shaft, a second stage gear assembly coupled 100 to the interstage shaft, and an output shaft coupled to the fan shaft. The double gearbox assembly is characterized by a Double Gearbox Engine Parameter (DGEP) in a range from 150 to 650 kilograms, the DGEP being given by $$k \times S \times \sum_{i=1}^{2}$$

(Continued)

-continued $$\left( \frac{P_{fan} \times 10^6 \times z_i}{376 \times \omega_{ring\,i} \times n_{planetsi} \times R_{ring\,i}^{\,2}} \times \pi \times \frac{R_{ring\,i}^{\,2}}{z_i^{\,2}} \times (18.5 \times z_i + 85.5625) \right).$$

20 Claims, 8 Drawing Sheets

(56)     References Cited

U.S. PATENT DOCUMENTS

| | | | |
|---|---|---|---|
| 11,686,254 B1 | 6/2023 | Dindar et al. | |
| 11,971,085 B2 * | 4/2024 | Mastellone | F16H 1/28 |
| 12,072,002 B2 | 8/2024 | Francois et al. | |
| 2011/0290057 A1 | 12/2011 | Corcoran | |
| 2020/0158213 A1 | 5/2020 | Leque et al. | |
| 2022/0170533 A1 | 6/2022 | Luo | |
| 2022/0316404 A1 | 10/2022 | Molesini et al. | |
| 2023/0400093 A1 | 12/2023 | Mouly | |
| 2024/0280164 A1 | 8/2024 | Mastellone et al. | |

FOREIGN PATENT DOCUMENTS

| | | | |
|---|---|---|---|
| FR | 3127025 A1 | 3/2023 | |
| FR | 3129436 A1 | 5/2023 | |
| FR | 3129690 A1 | 6/2023 | |
| FR | 3130747 A1 | 6/2023 | |
| FR | 3130875 A1 | 6/2023 | |

* cited by examiner

300 ⬎

TURBOFAN ENGINE INCLUDING A DOUBLE GEARBOX ASSEMBLY HAVING A DOUBLE GEARBOX ENGINE PARAMETER

CROSS REFERENCE TO RELATED APPLICATIONS

The present application claims the benefit of Italian Patent Application No. 102025000005967, filed on Mar. 24, 2025, which is hereby incorporated by reference herein in its entirety.

TECHNICAL FIELD

The present disclosure relates generally to gearbox assemblies for turbofan engines, for example, for an aircraft.

BACKGROUND

Turbofan engines for an aircraft generally include a fan having fan blades and a turbo-engine arranged in flow communication with one another. Some turbofan engines include a gearbox assembly that transfers torque and power from the turbo-engine to the fan.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
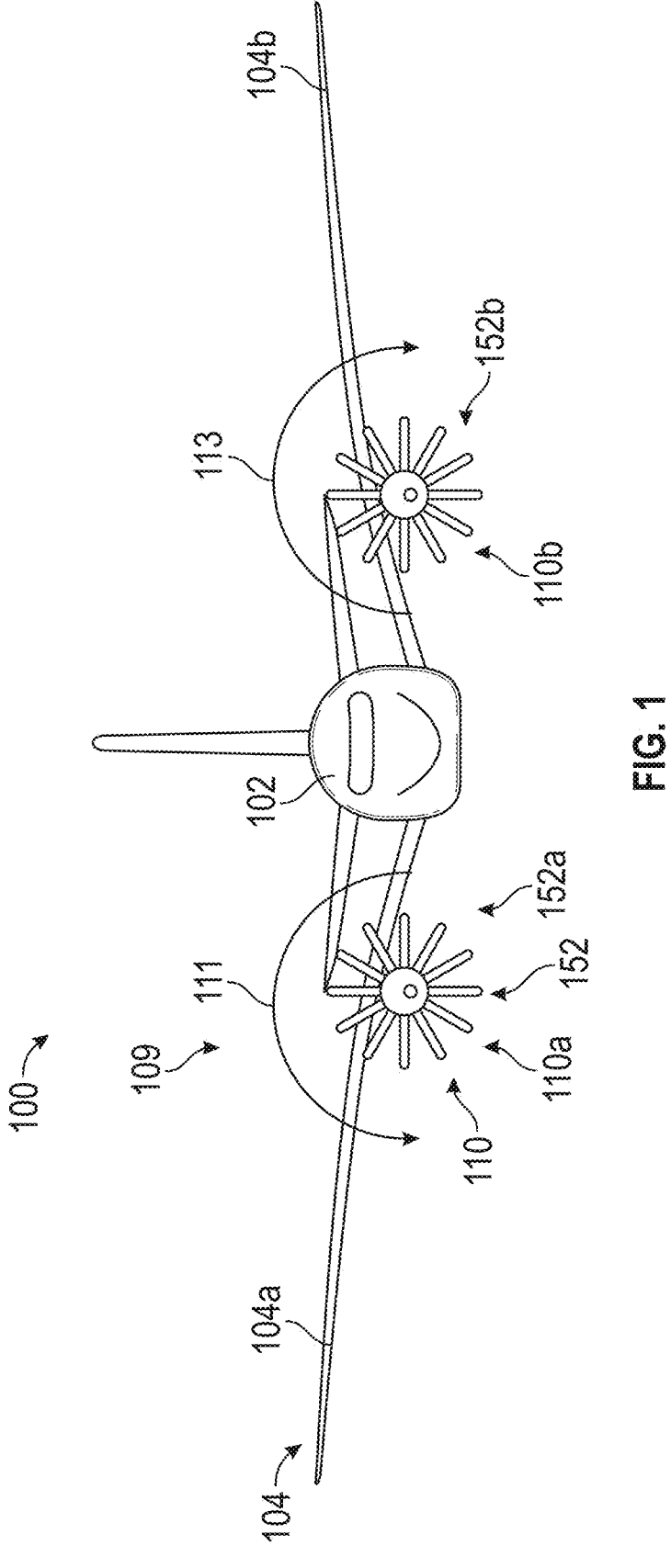
FIG. 1 is a front schematic, view of an aircraft having an engine system, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," "third," etc., may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbofan engine or vehicle and refer to the normal operational attitude of the turbofan engine or the aircraft. More particularly, forward and aft are used herein with reference to a direction of travel of the vehicle and a direction of propulsive thrust of the turbofan engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the aircraft or the turbofan engine. Moreover, the terms "radial" and "radially" refer to directions and orientations that extend substantially perpendicular to the centerline of the aircraft or the turbofan engine. In addition, as used herein, the terms "circumferential" and "circumferentially" refer to directions and orientations that extend arcuately about the centerline of the aircraft or the turbofan engine.

As used herein, a "turbo-engine" includes a compressor section, a combustion section, and a turbine section.

As used herein, a "turbofan engine" includes a turbo-engine and a fan that directs air into the turbo-engine, and rated for use in a regional aircraft, narrow body aircraft, or wide body aircraft. A turbofan engine rated for use on a regional aircraft will have a maximum takeoff thrust in a range of ten thousand pound-force to twenty thousand pound-force (10,000 lbf to 20,000 lbf). A turbofan engine rated for use on a narrow body aircraft will have a maximum takeoff thrust in a range of fifteen thousand pound-force to thirty thousand pound-force (15,000 lbf to 30,000 lbf). A turbofan engine rated for use on a wide body aircraft will have a maximum takeoff thrust in a range of forty thousand pound-force to one hundred ten thousand pound-force (40,000 lbf to 110,000 lbf).

As used herein, a "ducted" engine means a turbofan engine with a fan casing or a nacelle that circumferentially surrounds the fan.

As used herein, an "unducted fan engine" or an "open fan engine" means a turbofan engine without a fan casing or a nacelle surrounding the fan.

As used herein, "clockwise" or a "clockwise direction" is a direction of rotation, when viewed from forward of the aircraft, the turbofan engine, or the gearbox assembly, that corresponds to a direction in which the hands of a clock rotate as viewed from forward of the clock.

As used herein, "counterclockwise" or a "counterclockwise direction" is a direction of rotation, when viewed from forward of the aircraft, the turbofan engine, or the gearbox assembly, that corresponds to an opposite direction to that in which the hands of the clock rotate as viewed from forward of the clock. Counterclockwise is a rotation direction that is opposite clockwise.

As used herein, "gear ratio" is a ratio of a rotational speed of an input of the gearbox assembly to a rotational speed of an output of the gearbox assembly.

As used herein, a "double gearbox assembly" is a gearbox assembly having two stages of gear assemblies. For example, the double gearbox assemblies detailed herein include a first stage gear assembly and a second stage gear assembly. The output of the first stage gear assembly is the input of the second stage gear assembly.

As used herein, a "pitch circle" of a ring gear is an imaginary circle that intersects the teeth of the ring gear and the teeth of a planet gear at a mesh of the ring gear with the planet gear. In particular, the pitch circle is located at an average diameter between a tooth peak and a tooth valley of the ring gear and the planet gear, at which there is no sliding between the teeth of the ring gear and the teeth of the planet gear.

As used herein, a "ring gear pitch radius" ($R_{ring}$) is a radius of the pitch circle of the ring gear measured from a longitudinal centerline axis of the ring gear to the pitch circle.

As used herein, the terms "low," "mid" (or "mid-level"), and "high," or their respective comparative degrees (e.g., "lower" and "higher", where applicable), when used with compressor, combustor, turbine, shaft, fan, or turbofan engine components, each refers to relative pressures, relative speeds, relative temperatures, or relative power outputs within an engine unless otherwise specified. For example, a "low-power" setting defines the engine or the combustor configured to operate at a power output lower than a "high-power" setting of the engine or the combustor, and a "mid-power" setting defines the engine or the combustor configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine. A mission cycle for a turbofan engine includes, for example, a low-power operation, a mid-power operation, and a high-power operation. Low-power operation includes, for example, engine start, idle, taxiing, and approach. Mid-power operation includes, for example, cruise. High-power operation includes, for example, takeoff and climb.

The various power levels of the turbofan engine are defined as a percentage of a sea level static (SLS) maximum engine rated thrust. Low-power operation includes, for example, less than thirty percent (30%) of the SLS maximum engine rated thrust of the turbofan engine. Mid-power operation includes, for example, thirty percent (30%) to eighty-five percent (85%) of the SLS maximum engine rated thrust of the turbofan engine. High-power operation includes, for example, greater than eighty-five percent (85%) of the SLS maximum engine rated thrust of the turbofan engine. The values of the thrust for each of the low-power operation, the mid-power operation, and the high-power operation of the turbofan engine are exemplary only, and other values of the thrust can be used to define the low-power operation, the mid-power operation, and the high-power operation.

As used herein, "cruise," "cruise conditions," or "cruise speed" occurs during a phase of a flight of an aircraft after ascent until the aircraft begins to descend. The cruise speed is the average speed of the aircraft once the aircraft has finished ascent (after take-off). Cruise occurs during the mid-power operation of the turbofan engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, a two, a four, a ten, a fifteen, or a twenty percent margin in either individual values, range(s) of values and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure provides for an engine system that includes turbofan engines, and, particularly, includes open fan engines. The engine system includes two open fan engines including a first open fan engine mounted on a first side of an aircraft and a second open fan engine mounted on a second side of the aircraft. Turbofan engines typically have a uniform design such that the fan of the turbofan engine rotates in the same direction between two turbofan engines. This is referred to as an asymmetric configuration. The fans on both sides of the aircraft rotate in the same direction in the asymmetric configuration. Accordingly, the fan rotation of the two turbofan engines results in an undesired change in a yaw of the aircraft towards the rotation direction of the fans. This could result in an additional 1% fuel burn of the turbofan engines due to the need to correct the change in the yaw, and an additional two effective perceived noise level (EPNdB) community noise due to the additional fuel burn.

The open fan engines have a gearbox assembly, also referred to as a power gearbox, that transfers power from a turbine shaft of the turbofan engine to a fan (e.g., a fan shaft or a propeller shaft). Such turbofan engines are referred to as indirect drive engines. Indirect drive engines differ from direct drive engines that directly couple the fan shaft to the turbine shaft without the use of a gearbox. The fan of direct drive engines rotates at a same speed as the turbine shaft. The fan of indirect drive engines, however, rotates at a lower speed than the turbine shaft due to the reduction of speed through the power gearbox. For turbofan engines that are open fan engines, the gearbox assembly needs to have a gear ratio in a range of 7:1 to 12:1 to drive the fan at the required speed and torque for the open fan engine to achieve a required thrust level.

The present disclosure provides for an engine system having two counter-rotating fans on the aircraft such that the first turbofan engine has a fan that rotates counterclockwise and the second turbofan engine has a fan that rotates clockwise. Such an engine system provides for a symmetric configuration such that the fans eliminate the undesired change of the yaw of the aircraft. To achieve the counter-rotating fans, a first turbofan engine of the engine system includes a gearbox assembly having a single gear assembly and a second turbofan engine of the engine system includes a double gearbox assembly having two gear assemblies arranged in series. The single gear assembly of the first turbofan engine has an input that rotates in the counterclock-wise direction and an output that rotates in the clockwise direction. The double gearbox assembly of the second turbofan engine has an input that rotates in the counterclock-wise direction and an output that rotates in the counterclock-wise direction. Such a configuration allows the second turbofan engine to be substantially similar to the first tur-bofan engine (e.g., both engines have LP shafts that rotate counterclockwise) while the double gearbox assembly for the counterclockwise output achieves substantially the same gear ratio, speed, and torque output as the gearbox assembly of the first turbofan engine with the clockwise output. Such a configuration allows both turbofan engines to have the same input rotational direction (e.g., counterclockwise) while having different output rotational directions (e.g., counterclockwise on one engine and clockwise on the other engine).

The main challenge in designing a gearbox assembly is balancing structural requirements, assembly requirements, reliability requirements, and weight requirements all at the same time. In designing a gearbox assembly (e.g., the number of planet gears, the number of teeth of the gears, the size of the gears in the radial direction and the axial direction, etc.) for achieving a particular gear ratio for a required power and torque output, the weight of the gearbox assembly is minimized while balancing with the structural requirements, the assembly requirements, and the reliability requirements in order to reduce the overall turbine engine weight. The weight of the gearbox assembly is typically determined after the components and the parameters (e.g., the number of planet gears, the number of teeth of the gears, the size of the gears in both the radial direction and the axial direction, etc., for achieving a particular gear ratio for a particular power and torque output) of the gearbox assembly have already been determined and designed. Further, current systems of estimating the weight of the gearbox earlier in the design process based on power output and input, and output rotational speed, become inaccurate as the power output and the rotational speeds increase such as in open fan engines as compared to, for example, turboprop engines that have much less power and rotational speeds.

As turbine engines increase in power (e.g., in a range of 11,000 kW to 15,000 kW) and thrust (e.g., in a range of 23,000 lbf to 27,000 lbf), the torques described herein become more challenging to achieve while assuring a weight of the gearbox assembly, and, thus, the overall weight of the turbine engine, is reduced. The inventors, seeking to improve upon the existing design of gearbox assemblies, designed several different configurations of the gearbox assembly and the turbine engine to arrive at an improved design, better suited to handle the power and the torque through the gearbox assembly for different architectures, thereby improving efficiency and power output of the gear-box assembly, while reducing a weight of the gearbox assembly.

Referring now to the drawings, FIG. 1 is a front schematic view of an aircraft 100 having an engine system 109, according to the present disclosure. As shown in FIG. 1, the aircraft 100 includes a fuselage 102 and a plurality of wings 104 coupled to the fuselage 102. The plurality of wings 104 includes a first wing 104a and a second wing 104b. The aircraft 100 is exemplary only and can include any type of aircraft 100 having the engine system 109 detailed herein.

The engine system 109 includes a plurality of turbofan engines 110 including a first turbofan engine 110a and a second turbofan engine 110b. The plurality of turbofan engines 110 is mounted to the aircraft 100, particularly, mounted to the plurality of wings 104. Specifically, the first turbofan engine 110a is mounted to the first wing 104a and the second turbofan engine 110b is mounted to the second wing 104b. The plurality of turbofan engines 110 is sus-pended beneath the plurality of wings 104 in an under-wing configuration. Alternatively, however, in other exemplary embodiments, any other suitable aircraft engine configura-tion may be provided (e.g., an over-wing configuration).

The plurality of turbofan engines 110 includes open-fan turbofan engines that each has a fan 152 that is unducted. In this way, the plurality of turbofan engines 110 does not include a fan casing or a nacelle that surrounds the fan 152. An exemplary open-fan turbofan engine is detailed further below with respect to FIG. 2. The first turbofan engine 110a includes a first fan 152a and the second turbofan engine 110b includes a second fan 152b. As detailed further below, the first turbofan engine 110a is configured such that the first fan 152a rotates in a first direction 111 and the second turbofan engine 110b is configured such that the second fan 152b rotates in a second direction 113. The second direction 113 is opposite the first direction 111. In particular, the first direction 111 is a counterclockwise direction and the second direction 113 is a clockwise direction. In the view of FIG. 1, the first turbofan engine 110a is mounted on a left side of the aircraft 100 and the second turbofan engine 110b is mounted on a right side of the aircraft 100. Thus, the first fan 152a (counterclockwise rotation) and the second fan 152b (clock-wise rotation) rotate away from the fuselage 102 in an up-up configuration.

Figure 2:
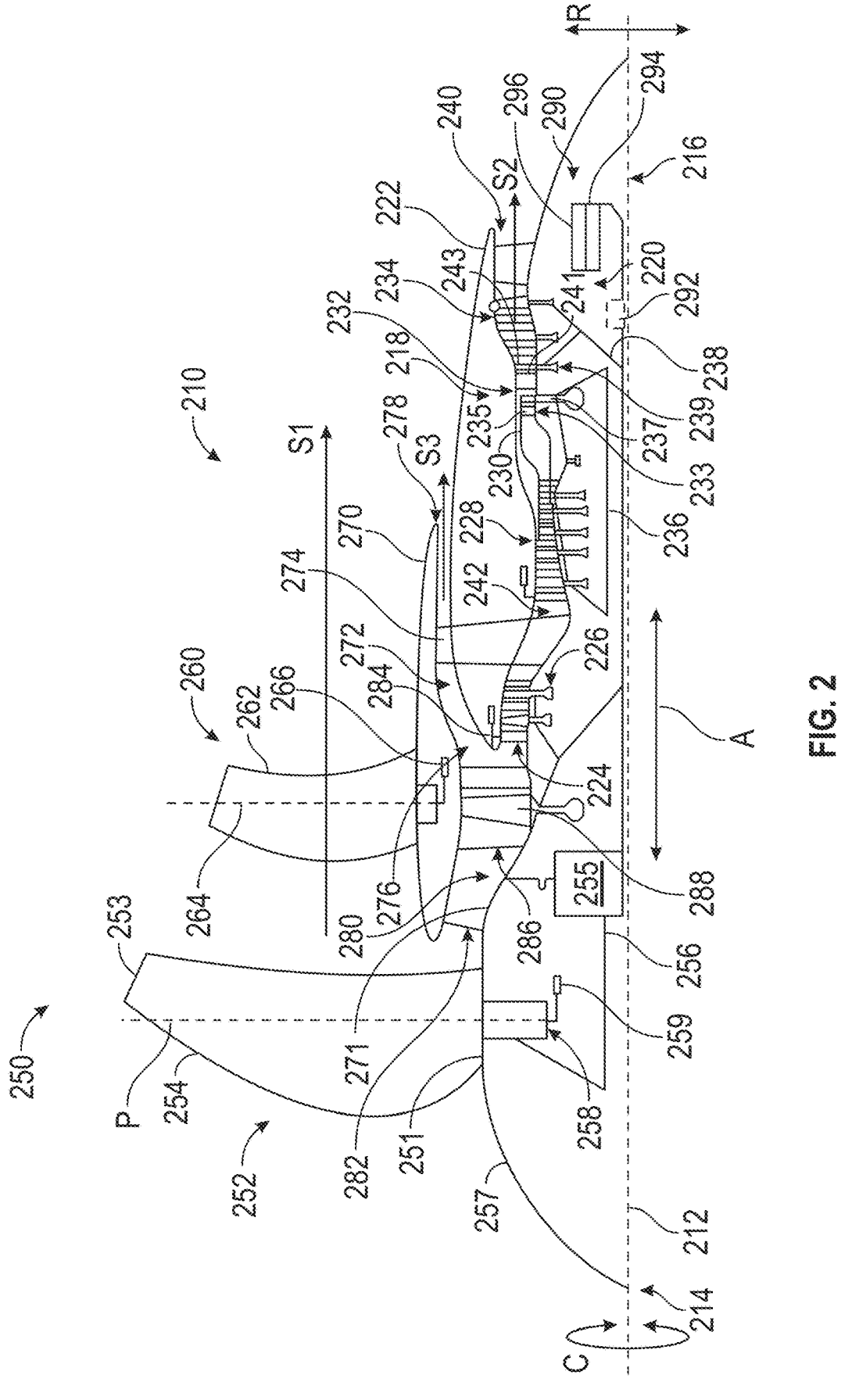
FIG. 2 is a schematic cross-sectional view of a turbofan engine, taken along a longitudinal centerline axis of the turbofan engine, according to the present disclosure.

FIG. 2 is a schematic, cross-sectional view of a turbofan engine 210, taken along a longitudinal centerline axis 212 of the turbofan engine 210, according to the present disclosure. The turbofan engine 210 can be utilized as one of the plurality of turbofan engines 110 (the first turbofan engine 110a and the second turbofan engine 110b) of FIG. 1. The turbofan engine 210 is an unducted fan engine or an open fan engine. The turbofan engine 210 is a "three-stream engine" in that its architecture provides three distinct streams (la-beled S1, S2, and S3) of thrust-producing airflow during operation, as detailed further below.

As shown in FIG. 2, the turbofan engine 210 defines an axial direction A, a radial direction R, and a circumferential direction C. Moreover, the turbofan engine 210 defines a longitudinal centerline axis 212 that extends along the axial direction A. In general, the axial direction A extends parallel to the longitudinal centerline axis 212, the radial direction R extends outward from, and inward to, the longitudinal centerline axis 212 in a direction orthogonal to the axial direction A, and the circumferential direction C extends three hundred sixty degrees (360°) around the longitudinal centerline axis 212. The turbofan engine 210 extends between a forward end 214 and an aft end 216, e.g., along the axial direction A.

The turbofan engine 210 includes a turbo-engine 220 and a fan assembly 250 positioned upstream thereof. Generally, the turbo-engine 220 includes a compressor section, a com-bustion section, a turbine section, and an exhaust section. Particularly, as shown in FIG. 2, the turbo-engine 220 includes an engine core 218 and a core cowl 222 that annularly surrounds the turbo-engine 220. The turbo-engine 220 and the core cowl 222 define a core inlet 224 having an annular shape that is annular about the longitudinal centerline axis 212. The core cowl 222 further encloses and supports a low-pressure (LP) compressor 226 (also referred to as a booster) for pressurizing the air that enters the turbo-engine 220 through the core inlet 224. A high-pressure (HP) compressor 228 receives pressurized air from the LP compressor 226 and further increases the pressure of the air. The pressurized air flows downstream to a combustor 230 where fuel is injected into the pressurized air and ignited to raise the temperature and the energy level of the pressurized air, thereby generating combustion gases.

The combustion gases flow from the combustor 230 downstream to a high-pressure (HP) turbine 232. The HP turbine 232 drives the HP compressor 228 through a first shaft, also referred to as a high-pressure (HP) shaft 236 (also referred to as a "high-speed shaft"). In this regard, the HP turbine 232 is drivingly coupled with the HP compressor 228. Together, the HP compressor 228, the combustor 230, and the HP turbine 232 define the engine core 218. The combustion gases then flow to a power turbine or a low-pressure (LP) turbine 234. The LP turbine 234 drives the LP compressor 226 and components of the fan assembly 250 through a second shaft, also referred to as a low-pressure (LP) shaft 238 (also referred to as a "low-speed shaft"). In this regard, the LP turbine 234 is drivingly coupled with the LP compressor 226 and components of the fan assembly 250. The LP shaft 238 is coaxial with the HP shaft 236 in the embodiment of FIG. 2. After driving each of the HP turbine 232 and the LP turbine 234, the combustion gases exit the turbo-engine 220 through a core exhaust nozzle 240. The turbo-engine 220 defines a core flowpath, also referred to as a core duct 242, that extends between the core inlet 224 and the core exhaust nozzle 240. The core duct 242 is an annular duct positioned generally inward of the core cowl 222 along the radial direction R.

The fan assembly 250 includes a fan 252 (e.g., the first fan 152*a* or the second fan 152*b*), also referred to as a primary fan. For the embodiment of FIG. 2, the fan 252 is an open rotor fan, also referred to as an unducted fan. However, in other embodiments, the fan 252 may be ducted, e.g., by a fan casing or a nacelle circumferentially surrounding the fan 252. The fan 252 includes a plurality of fan blades 254 (only one shown in FIG. 2) that extends in the radial direction R from a fan root 251 to a fan tip 253. The plurality of fan blades 254 is rotatable about the longitudinal centerline axis 212 via a fan shaft 256. As shown in FIG. 2, the fan shaft 256 is coupled with the LP shaft 238 via a speed reduction gearbox or a power gearbox, also referred to as a gearbox assembly 255, e.g., in an indirect-drive configuration.

The gearbox assembly 255 is shown schematically in FIG. 2. The gearbox assembly 255 includes a plurality of gears for adjusting the rotational speed of the fan shaft 256 and, thus, the fan 252 relative to the LP shaft 238 to a more efficient rotational fan speed. The gearbox assembly 255 has a gear ratio in a range of 7:1 to 12:1 and may be configured in a star-star configuration or a star-planetary configuration, as detailed further below. The gearbox assembly 255 is a compound gearbox (e.g., having a plurality of stages of gear assemblies).

The fan blades 254 can be arranged in equal spacing around the longitudinal centerline axis 212. Each fan blade 254 extends outwardly from a disk (not shown in FIG. 2) generally along the radial direction R. The disk is covered by a fan hub 257 that is rotatable and aerodynamically contoured to promote an airflow through the plurality of fan blades 254. Each fan blade 254 has a root and a tip, and a span defined therebetween. Each of the plurality of fan blades 254 defines a pitch axis P. For the embodiment of FIG. 2, each of the plurality of fan blades 254 of the fan 252 is rotatable about their respective pitch axis P, e.g., in unison with one another. A fan pitch actuation system (FPAS) 258 controls one or more actuators 259 to pitch the fan blades 254 about their respective pitch axis P.

The fan assembly 250 further includes a fan guide vane array 260 that includes a plurality of fan guide vanes 262 (only one shown in FIG. 2) disposed around the longitudinal centerline axis 212. For the embodiment of FIG. 2, the plurality of fan guide vanes 262 is not rotatable about the longitudinal centerline axis 212. Each of the plurality of fan guide vanes 262 has a root and a tip, and a span defined therebetween. The plurality of fan guide vanes 262 can be unshrouded as shown in FIG. 2 or can be shrouded, e.g., by an annular shroud spaced outward from the tips of the fan guide vanes 262 along the radial direction R. Each of the plurality of fan guide vanes 262 defines a vane pitch axis 264. For the embodiment of FIG. 2, each of the plurality of fan guide vanes 262 of the fan guide vane array 260 is rotatable about their respective vane pitch axis 264, e.g., in unison with one another. One or more actuators 266 are controlled to pitch the plurality of fan guide vanes 262 about their respective vane pitch axis 264. In other embodiments, each of the plurality of fan guide vanes 262 is fixed or is unable to be pitched about the vane pitch axis 264. The plurality of fan guide vanes 262 is mounted to a fan cowl 270. The fan cowl 270 includes a fan frame 271 that supports the fan assembly 250.

The fan cowl 270 annularly encases at least a portion of the core cowl 222 and is generally positioned outward of the core cowl 222 along the radial direction R. Particularly, a downstream section of the fan cowl 270 extends over a forward portion of the core cowl 222 to define a fan flowpath, also referred to as a fan duct 272. Incoming air enters through the fan duct 272 through a fan duct inlet 276 and exits through a fan exhaust nozzle 278 to produce propulsive thrust. The fan duct 272 is an annular duct positioned generally outward of the core duct 242 along the radial direction R. The fan cowl 270 and the core cowl 222 are connected together and supported by a plurality of struts 274 (only one shown in FIG. 2) that extends substantially radially and are circumferentially spaced about the longitudinal centerline axis 212. The plurality of struts 274 is each aerodynamically contoured to direct air flowing thereby. Other struts, in addition to the plurality of struts 274, can be used to connect and to support the fan cowl 270 and the core cowl 222.

The turbofan engine 210 also defines or includes an inlet duct 280. The inlet duct 280 extends between an engine inlet 282, and the core inlet 224 and the fan duct inlet 276. The engine inlet 282 is defined generally at the forward end of the fan cowl 270 and is positioned between the fan 252 and the fan guide vane array 260 along the axial direction A. The inlet duct 280 is an annular duct that is positioned inward of the fan cowl 270 along the radial direction R. Air flowing downstream along the inlet duct 280 is split, not necessarily evenly, into the core duct 242 and the fan duct 272 by a splitter 284 of the core cowl 222. The inlet duct 280 is wider than the core duct 242 along the radial direction R. The inlet duct 280 is also wider than the fan duct 272 along the radial direction R.

The fan assembly 250 also includes a mid-fan 286. The mid-fan 286 includes a plurality of mid-fan blades 288 (only one shown in FIG. 2). The plurality of mid-fan blades 288 is rotatable, e.g., about the longitudinal centerline axis 212. The mid-fan 286 is drivingly coupled with the LP turbine 234 via the LP shaft 238. The plurality of mid-fan blades 288 can be arranged in an equal circumferential spacing about the longitudinal centerline axis 212. The plurality of mid-fan blades 288 is annularly surrounded (e.g., ducted) by the fan cowl 270. In this regard, the mid-fan 286 is positioned inward of the fan cowl 270 along the radial direction R. The mid-fan 286 is positioned within the inlet duct 280 upstream of both the core duct 242 and the fan duct 272. A ratio of a span of a fan blade 254 to that of a mid-fan blade 288 (a span is measured from a root to tip of the respective blade) is greater than two and less than ten, to achieve the desired benefits of the third stream (S3), particularly, the additional thrust it offers to the engine, which can enable a smaller diameter fan blade 254 (benefits engine installation).

Accordingly, air flowing through the inlet duct 280 flows across the plurality of mid-fan blades 288 and is accelerated downstream thereof. At least a portion of the air accelerated by the mid-fan blades 288 flows into the fan duct 272 and is ultimately exhausted through the fan exhaust nozzle 278 to produce propulsive thrust. Also, at least a portion of the air accelerated by the plurality of mid-fan blades 288 flows into the core duct 242 and is ultimately exhausted through the core exhaust nozzle 240 to produce propulsive thrust. Generally, the mid-fan 286 is a compression device positioned downstream of the engine inlet 282. The mid-fan 286 is operable to accelerate air into the fan duct 272, also referred to as a secondary bypass passage.

During operation of the turbofan engine 210, an initial airflow or an incoming airflow passes through the fan blades 254 of the fan 252, and splits into a first airflow and a second airflow. The first airflow bypasses the engine inlet 282 and flows generally along the axial direction A outward of the fan cowl 270 along the radial direction R. The first airflow accelerated by the fan blades 254 passes through the fan guide vanes 262 and continues downstream thereafter to produce a primary propulsion stream or a first thrust stream S1. A majority of the net thrust produced by the turbofan engine 210 is produced by the first thrust stream S1. The second airflow enters the inlet duct 280 through the engine inlet 282.

The second airflow flowing downstream through the inlet duct 280 flows through the plurality of mid-fan blades 288 of the mid-fan 286 and is consequently compressed. The second airflow flowing downstream of the mid-fan blades 288 is split by the splitter 284 located at the forward end of the core cowl 222. Particularly, a portion of the second airflow flowing downstream of the mid-fan 286 flows into the core duct 242 through the core inlet 224. The portion of the second airflow that flows into the core duct 242 is progressively compressed by the LP compressor 226 and the HP compressor 228, and is ultimately discharged into the combustion section. The discharged pressurized air stream flows downstream to the combustor 230 where fuel is introduced to generate combustion gases or products.

The combustor 230 defines an annular combustion chamber that is generally coaxial with the longitudinal centerline axis 212. The combustor 230 receives pressurized air from the HP compressor 228 via a pressure compressor discharge outlet. A portion of the pressurized air flows into a mixer. Fuel is injected by a fuel nozzle (omitted for clarity) to mix with the pressurized air thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, one or more HP turbine stages 233 of the HP turbine 232. Each HP turbine stage 233 of the HP turbine 232 consists of a plurality of HP turbine stator vanes 235 and a plurality of HP turbine rotor blades 237 coupled to the HP shaft 236. The combustion gases exit the HP turbine 232 and flow through a plurality of LP turbine stages 239 of the LP turbine 234. Each LP turbine stage 239 of the LP turbine 234 consists of a plurality of LP turbine stator vanes 241 and a plurality of LP turbine rotor blades 243 coupled to the LP shaft 238. The combustion gases then exit the core duct 242 through the core exhaust nozzle 240 to produce a core air stream, also referred to as a second thrust stream S2. As noted above, the HP turbine 232 drives the HP compressor 228 via the HP shaft 236, and the LP turbine 234 drives the LP compressor 226, the fan 252, and the mid-fan 286 via the LP shaft 238.

The other portion of the second airflow flowing downstream of the mid-fan 286 is split by the splitter 284 into the fan duct 272. The air enters the fan duct 272 through the fan duct inlet 276. The air flows generally along the axial direction A through the fan duct 272 and is ultimately exhausted from the fan duct 272 through the fan exhaust nozzle 278 to produce a third stream, also referred to as a third thrust stream S3.

The third thrust stream S3 is a secondary air stream that increases fluid energy to produce a minority of total engine system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and, thereby, a percent contribution to total thrust, are passively adjusted during engine operation or can be modified purposefully through the use of engine control features (such as fuel flow, electric machine power, variable stators, variable inlet guide vanes, valves, variable exhaust geometry, or fluidic features) to adjust or to improve overall system performance across a broad range of potential operating conditions.

The turbofan engine 210 depicted in FIG. 2 is by way of example only. In other embodiments, the turbofan engine 210 may have other suitable configurations. For example, the fan 252 can be ducted by a fan casing or a nacelle such that a bypass passage is defined between the fan casing and the fan cowl 270. Moreover, in other embodiments, any other suitable number or configuration of compressors, turbines, shafts, or a combination thereof may be provided. In still other embodiments, aspects of the present disclosure may be incorporated into any other suitable turbofan engine, such as, for example, turbofan engines defining two streams (e.g., a bypass stream and a core air stream).

Further, for the depicted embodiment of FIG. 2, the turbofan engine 210 includes an electric machine 290 (e.g., a motor-generator) operably coupled with a rotating component thereof. In this regard, the turbofan engine 210 is a hybrid-electric propulsion machine. Particularly, as shown in FIG. 2, the electric machine 290 is operatively coupled with the LP shaft 238. The electric machine 290 can be mechanically connected to the LP shaft 238, either directly, or indirectly, e.g., by way of a gearbox assembly 292 (shown schematically in FIG. 2). Further, although, in this embodiment the electric machine 290 is operatively coupled with the LP shaft 238 at an aft end of the LP shaft 238, the electric machine 290 can be coupled with the LP shaft 238 at any suitable location or can be coupled to other rotating components of the turbofan engine 210, such as the HP shaft 236 or the LP shaft 238. For instance, in some embodiments, the electric machine 290 can be coupled with the LP shaft 238 and positioned forward of the mid-fan 286 along the axial direction A. In some embodiments, the turbofan engine of FIG. 1 also includes an electric machine coupled to the LP shaft and located in the tail cone of the engine.

In some embodiments, the electric machine 290 can be an electric motor operable to drive or to motor the LP shaft 238. In other embodiments, the electric machine 290 can be an electric generator operable to convert mechanical energy into electrical energy. In this way, electrical power generated by the electric machine 290 can be directed to various engine systems or aircraft systems. In some embodiments, the electric machine 290 can be a motor/generator with dual functionality. The electric machine 290 includes a rotor 294 and a stator 296. The rotor 294 is coupled to the LP shaft 238 and rotates with rotation of the LP shaft 238. In this way, the rotor 294 rotates with respect to the stator 296, thereby generating electrical power. Although the electric machine 290 has been described and illustrated in FIG. 2 as having a particular configuration, the present disclosure may apply to electric machines having alternative configurations. For instance, the rotor 294 or the stator 296 may have different configurations or may be arranged in a different manner than illustrated in FIG. 2.

Figure 3A:
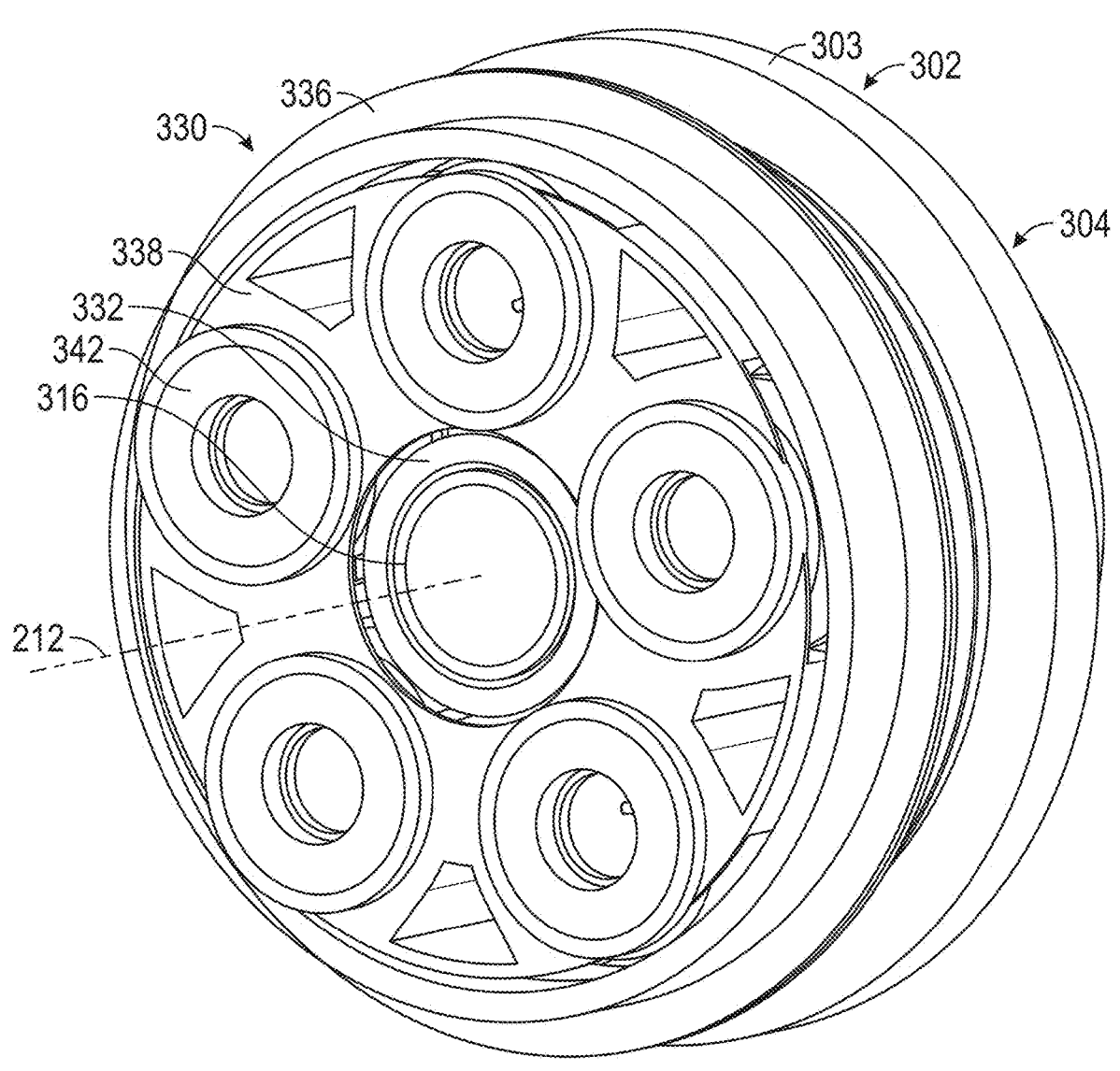
FIG. 3A is an elevational view showing a double gearbox assembly for a turbofan engine, according to the present disclosure.
Figure 3B:
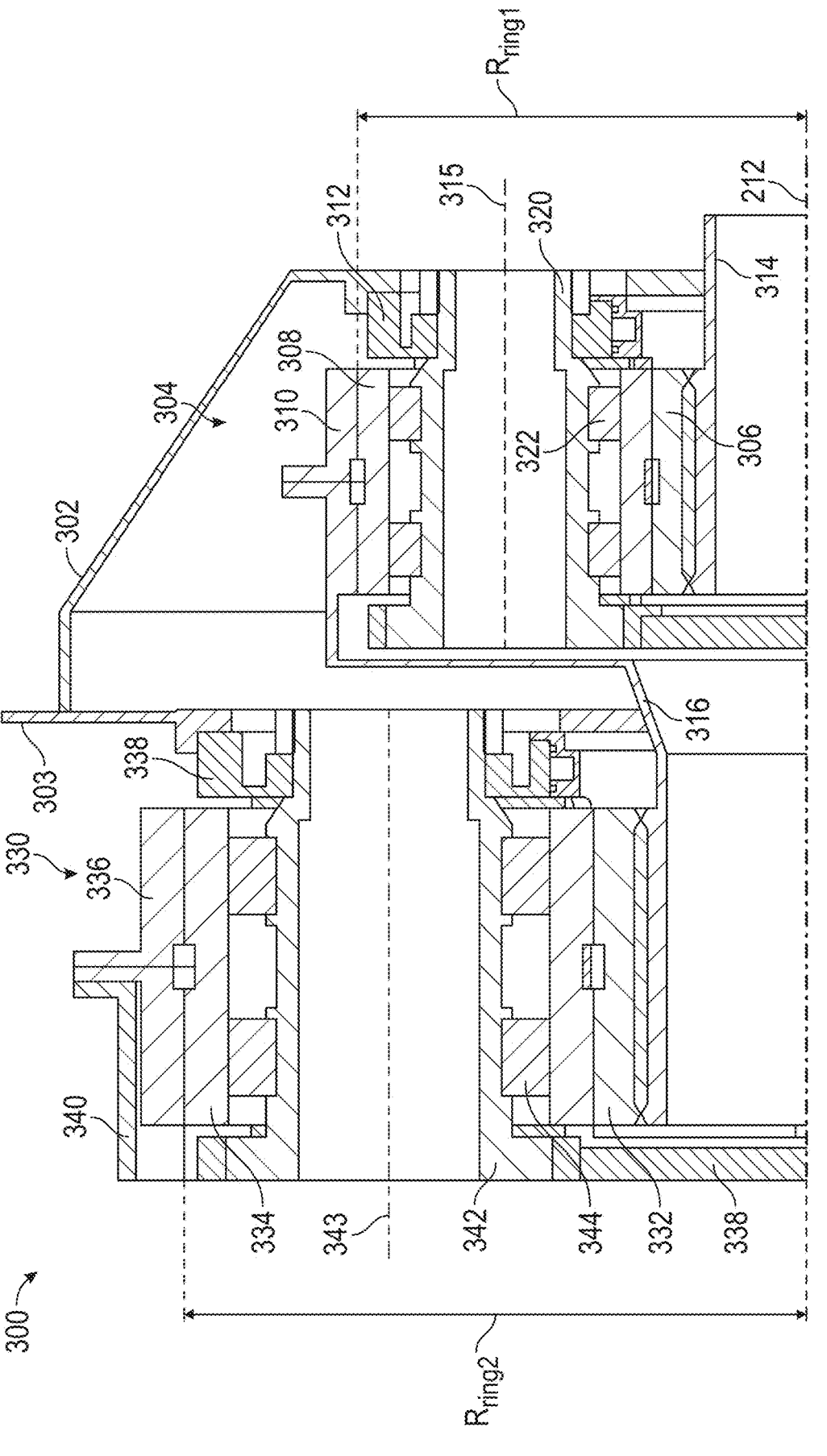
FIG. 3B is a schematic, partial, cross-sectional view of the double gearbox assembly of FIG. 3A, taken along a longitudinal centerline axis of the double gearbox assembly, according to the present disclosure.

FIG. 3A is an elevational view showing a double gearbox assembly (DGB) 300 for a turbofan engine, according to the present disclosure. FIG. 3B is a schematic, cross-sectional view of the double gearbox assembly 300, taken along the longitudinal centerline axis 212 of the double gearbox assembly 300, according to the present disclosure. The double gearbox assembly 300 can be utilized as the gearbox assembly 255 of the turbofan engine 210 of FIG. 2. In particular, the double gearbox assembly 300 is utilized in the first turbofan engine 110a of FIG. 1 for rotating the first fan 152a in the first direction 111 (counterclockwise direction).

The double gearbox assembly 300 has a counterclockwise rotational output (e.g., the output of the double gearbox assembly 300 rotates in the counterclockwise direction). The double gearbox assembly 300 includes a double gearbox casing 302 having a double gearbox coupling 303 that couples the double gearbox assembly 300 to a static structure of the turbofan engine 210 (e.g., the fan frame 271).

The double gearbox assembly 300 includes a first stage gear assembly 304 and a second stage gear assembly 330. The first stage gear assembly 304 and the second stage gear assembly 330 are contained within the double gearbox casing 302. The first stage gear assembly 304 and the second stage gear assembly 330 are in a serial relationship such that the first stage gear assembly 304 transfers power and torque to the second stage gear assembly 330. In this way, the first stage gear assembly 304 causes the second stage gear assembly 330 to rotate as the first stage gear assembly 304 rotates. As detailed further below, the first stage gear assembly 304 is an epicyclic gear assembly in a star configuration and the second stage gear assembly 330 is an epicyclic gear assembly in a star configuration. In this way, the input and the output of the first stage gear assembly 304 and the second stage gear assembly 330 both rotate in the counterclockwise direction. The double gearbox assembly 300 has a gear ratio in a range of 7:1 to 12:1. The first stage gear assembly 304 has a gear ratio in a range of 2:1 to 3.5:1. The second stage gear assembly 330 has a gear ratio in a range of 2:1 to 3.5:1.

With reference to FIG. 3B, the first stage gear assembly 304 is an epicyclic gear assembly and includes a first stage sun gear 306, a plurality of first stage planet gears 308 (only two of which are visible in FIG. 3B), and a first stage ring gear 310. For clarity, only a portion of the gears is shown. The first stage sun gear 306 has a first stage sun gear pitch radius. Each of the plurality of first stage planet gears 308 has a first stage planet gear pitch radius. The first stage ring gear 310 has a first stage ring gear pitch radius $R_{ring1}$. The first stage ring gear pitch radius $R_{ring1}$ of the gears is a pitch radius of a pitch circle of the gears. The pitch circle is an imaginary circle that intersects the teeth of a gear at a point where the face of the teeth mesh with the face of the teeth of another gear, as shown and detailed further below with respect to FIG. 4. The plurality of first stage planet gears 308 is contained and supported by a first stage planet carrier 312 (shown schematically in FIG. 3B). The first stage gear assembly 304 is a star configuration, in which the first stage planet carrier 312 is held fixed, with the first stage ring gear 310 allowed to rotate. For example, the first stage planet carrier 312 is coupled to the double gearbox casing 302 (which is coupled to the static structure of the turbofan engine).

The double gearbox assembly 300 includes an input shaft 314, an interstage shaft 316, and an output shaft 340. In FIG. 3B, the first stage sun gear 306 is coupled to the input shaft 314. In some embodiments, the input shaft 314 and the first stage sun gear 306 are a single unitary component. The input shaft 314 is coupled to the turbine section (FIG. 2) of the first turbofan engine 110a (FIG. 1). For example, the input shaft 314 can be coupled to, or can embody, the LP shaft 238 (FIG. 2). Radially outward of the first stage sun gear 306, and intermeshing therewith, is the plurality of first stage planet gears 308 that is coupled together and supported by the first stage planet carrier 312. The first stage planet carrier 312 supports the plurality of first stage planet gears 308 such that the plurality of first stage planet gears 308 is held fixed with respect to the longitudinal centerline axis 212, while enabling each first stage planet gear 308 of the plurality of first stage planet gears 308 to rotate about a first stage planet gear longitudinal axis 315 of each first stage planet gear 308. Radially outwardly of the plurality of first stage planet gears 308, and intermeshing therewith, is the first stage ring gear 310, which is an annular ring gear. In the star configuration, the interstage shaft 316 is driven by the first stage ring gear 310. The interstage shaft 316 is an output of the first stage gear assembly 304 and an input of the second stage gear assembly 330. For example, the first stage ring gear 310 is coupled to the second stage gear assembly 330 via the interstage shaft 316 such that rotation of the interstage shaft 316 causes the second stage gear assembly 330 to rotate. In this way, the first stage ring gear 310 is an output of the first stage gear assembly 304.

Each of the first stage planet gears 308 includes a first stage planet pin 320, about which a respective first stage planet gear 308 rotates. For example, the first stage planet pin 320 is disposed within a respective first stage planet gear 308. Each of the first stage planet gears 308 is supported by one or more first stage roller bearings 322 disposed radially between the first stage planet pin 320 and the first stage planet gear 308. FIG. 3B shows the one or more first stage roller bearings 322 include two first stage roller bearings 322 that are spaced axially from each other. A respective first stage planet gear 308, however, can include any number of first stage roller bearings 322 for supporting rotation of the first stage planet gear 308 about the first stage planet pin 320. The first turbofan engine 110*a* (FIG. 1) can also include a lubrication system that supplies a lubricant (e.g., oil) to the first stage gear assembly 304 to lubricate the gears and the first stage roller bearings 322.

The second stage gear assembly 330 is an epicyclic gear assembly and includes a second stage sun gear 332, a plurality of second stage planet gears 334 (only two of which are visible in FIG. 3B), and a second stage ring gear 336. For clarity, only a portion of the gears is shown. The second stage sun gear 332 has a second stage sun gear pitch radius. Each of the plurality of second stage planet gears 334 has a second stage planet gear pitch radius. The second stage ring gear 336 has a second stage ring gear pitch radius $R_{ring2}$. The second stage sun gear pitch radius is greater than the first stage sun gear pitch radius. The second stage planet gear pitch radius is greater than first stage planet gear pitch radius. The second stage ring gear pitch radius $R_{ring2}$ is greater than the first stage ring gear pitch radius $R_{ring2}$. The plurality of second stage planet gears 334 is contained and supported by a second stage planet carrier 338 (shown schematically in FIG. 3B). The second stage gear assembly 330 is a star configuration, in which the second stage planet carrier 338 is held fixed, with the second stage ring gear 336 allowed to rotate. For example, the second stage planet carrier 338 is coupled to the double gearbox casing 302 (which is coupled to the static structure of the turbofan engine).

In FIG. 3B, the second stage sun gear 332 is coupled to the interstage shaft 316 such that the interstage shaft 316 is an input of the second stage gear assembly 330. In some embodiments, the interstage shaft 316 and the second stage sun gear 332 are a single unitary component. Radially outward of the second stage sun gear 332, and intermeshing therewith, is the plurality of second stage planet gears 334 that is coupled together and supported by the second stage planet carrier 338. The second stage planet carrier 338 supports the plurality of second stage planet gears 334 such that the plurality of second stage planet gears 334 is held fixed with respect to the longitudinal centerline axis 212, while enabling each second stage planet gear 334 of the plurality of second stage planet gears 334 to rotate about a second stage planet gear longitudinal axis 343 of each second stage planet gear 334. Radially outwardly of the plurality of second stage planet gears 334, and intermeshing therewith, is the second stage ring gear 336, which is an annular ring gear. In the star configuration, the output shaft 340 is driven by the second stage ring gear 336. For example, the second stage ring gear 336 is coupled to the output shaft 340 such that rotation of the second stage ring gear 336 causes the output shaft 340 to rotate. In this way, the second stage ring gear 336 is an output of the second stage gear assembly 330. The output shaft 340 is coupled to, or formed with, the fan shaft 256 (FIG. 2) of the first turbofan engine 110*a* (FIG. 1) such that rotation of the output shaft 340 causes the fan shaft 256 (and the first fan 152*a*) to rotate.

Each of the second stage planet gears 334 includes a second stage planet pin 342, about which a respective second stage planet gear 334 rotates. For example, the second stage planet pin 342 is disposed within a respective second stage planet gear 334. Each of the second stage planet gears 334 is supported by one or more second stage roller bearings 344 disposed radially between the second stage planet pin 342 and the second stage planet gear 334. FIG. 3B shows the one or more second stage roller bearings

344 include two second stage roller bearings 344 that are spaced axially from each other. A respective second stage planet gear 334, however, can include any number of second stage roller bearings 344 for supporting rotation of the second stage planet gear 334 about the second stage planet pin 342. The lubrication system of the first turbofan engine 110*a* (FIG. 1) can supply the lubricant to the first stage gear assembly 304 to lubricate the gears and the first stage roller bearings 322.

In operation, the input shaft 314 (e.g., the LP shaft 238) rotates and transfers torque to the output shaft 340 through the first stage gear assembly 304 and the second stage gear assembly 330. In particular, the input shaft 314 transfers the torque to the first stage sun gear 306, causing the first stage sun gear 306 to rotate. The input shaft 314 and the first stage sun gear 306 rotate in the counterclockwise direction. The first stage sun gear 306 transfers the torque to the plurality of first stage planet gears 308 and drives the plurality of first stage planet gears 308 such that each first stage planet gear 308 rotates about the first stage planet gear longitudinal axis 315. The plurality of first stage planet gears 308 rotates in the clockwise direction (e.g., in a direction opposite of the first stage sun gear 306). The first stage planet carrier 312 holds the plurality of first stage planet gears 308 stationary with respect to the longitudinal centerline axis 212. The plurality of first stage planet gears 308 transfers the torque to the first stage ring gear 310 and drives the first stage ring gear 310 such that the first stage ring gear 310 rotates, thereby causing the interstage shaft 316 to rotate. The first stage ring gear 310 (and the interstage shaft 316) rotates in the clockwise direction such that the first stage ring gear 310 rotates in the same direction as that of the plurality of first stage planet gears 308 and an opposite direction as that of the first stage sun gear 306.

The first stage ring gear 310 transfers the torque to the second stage sun gear 332 through the interstage shaft 316, causing the second stage sun gear 332 to rotate. The second stage sun gear 332 rotates in the clockwise direction. The second stage sun gear 332 transfers the torque to the plurality of second stage planet gears 334 and drives the plurality of second stage planet gears 334 such that each second stage planet gear 334 rotates about the second stage planet gear longitudinal axis 343. The plurality of second stage planet gears 334 rotates in the counterclockwise direction (e.g., in a direction opposite of the second stage sun gear 332). The second stage planet carrier 338 holds the plurality of second stage planet gears 334 stationary with respect to the longitudinal centerline axis 212. The plurality of second stage planet gears 334 transfers the torque to the second stage ring gear 336 and drives the second stage ring gear 336 such that the second stage ring gear 336 rotates, thereby causing the output shaft 340 to rotate. The second stage ring gear 336 (and the output shaft 340) rotates in the counterclockwise direction such that the second stage ring gear 336 rotates in the same direction as that of the plurality of second stage planet gears 334 and an opposite direction as that of the second stage sun gear 332. In this way, the double gearbox assembly 300 is a counterclockwise gearbox assembly (e.g., a gearbox assembly having a counterclockwise output). Thus, the first fan 152*a* (coupled to the output shaft 340) rotates in the counterclockwise direction.

Figure 4:
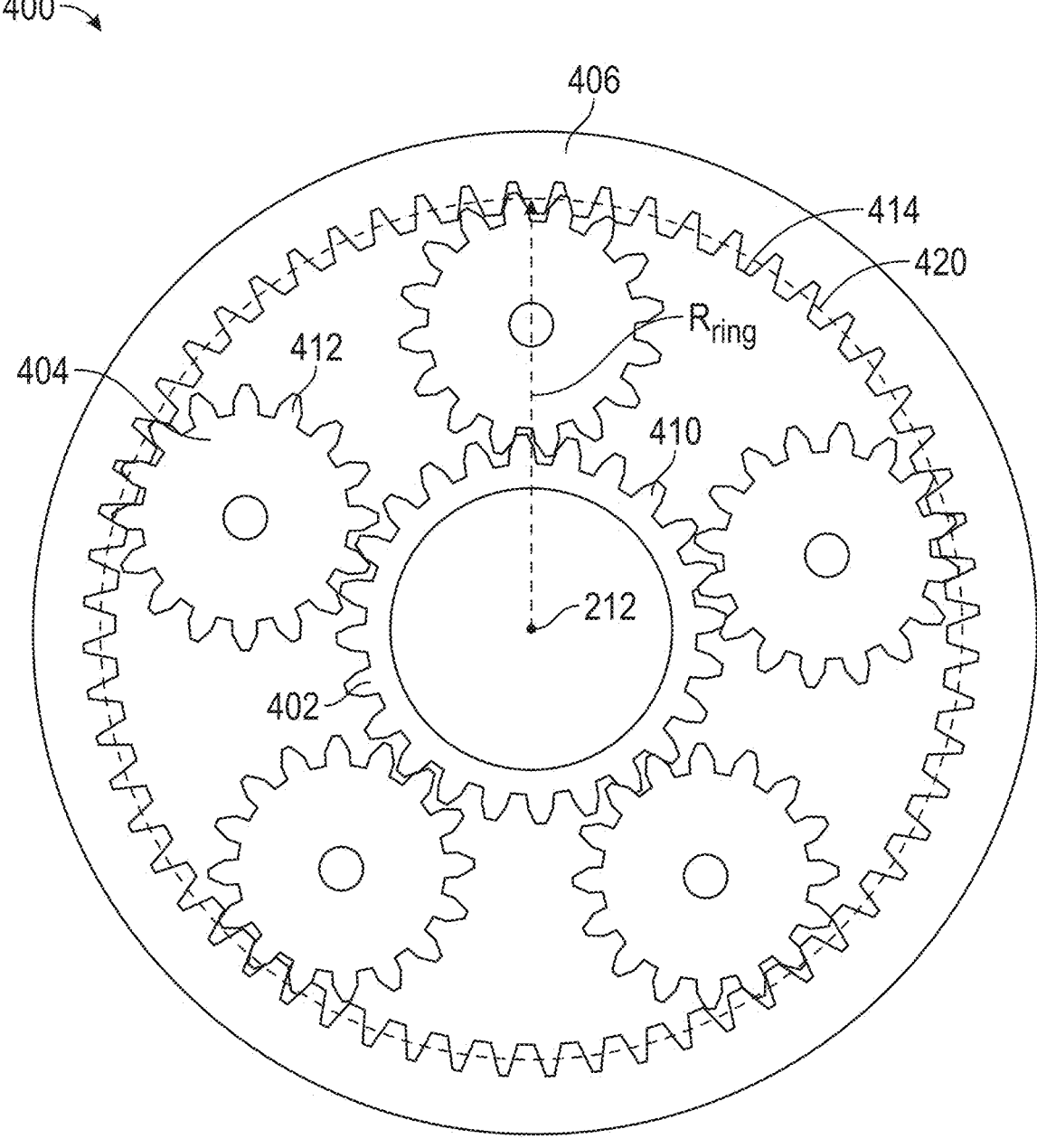
FIG. 4 is an enlarged schematic front view of a gear assembly for the double gearbox assembly of FIGS. 3A and 3B, according to the present disclosure.

FIG. 4 is an enlarged, schematic, front view of a gear assembly 400 for the double gearbox assembly 300 (FIGS. 3A and 3B), according to the present disclosure. The gear assembly 400 can be utilized as the first stage gear assembly 304 (FIG. 3B) or the second stage gear assembly 330 (FIG. 3B). The gear assembly 400 includes a sun gear 402, a plurality of planet gears 404, and a ring gear 406. The plurality of planet gears 404 is constrained by a planet carrier (not show for clarity). The sun gear 402 has a plurality of planet sun gear teeth 410. Each of the plurality of planet gears 404 has a plurality of planet gear teeth 412. The ring gear 406 has a plurality of ring gear teeth 414. The plurality of sun gear teeth 410 meshes with the plurality of planet gear teeth 412 such that the sun gear 402 rotates the plurality of planet gears 404 as the sun gear 402 rotates. The plurality of planet gear teeth 412 meshes with the plurality of ring gear teeth 414 such that the plurality of planet gears 404 rotate the ring gear 406 as the planet gears 404 rotate.

The gear assembly 400 has a ring gear pitch radius $R_{ring}$. The ring gear pitch radius $R_{ring}$ is a radius of a pitch circle 420 of the ring gear 406. The pitch circle 420 is defined as an imaginary circle that intersects the ring gear teeth 414 and the planet gear teeth 412 at the mesh of the ring gear 406 with the planet gears 404. In particular, the pitch circle 420 is located at an average diameter between a tooth peak and a tooth valley of the ring gear 406 and the planet gears 404 at which there is no sliding between the ring gear teeth 414 and the planet gear teeth 412. When the gear assembly 400 is utilized as the first stage gear assembly 304 (FIG. 3B), the sun gear teeth 410 are first stage sun gear teeth of the first stage sun gear 306, the planet gear teeth 412 are first stage planet gear teeth of the first stage planet gears 308, the ring gear teeth 414 are first stage ring gear teeth of the first stage ring gear 310, and the ring gear pitch radius $R_{ring}$ is the first stage ring gear pitch radius $R_{ring1}$. When the gear assembly 400 is utilized as the second stage gear assembly 330 (FIG. 3B), the sun gear teeth 410 are second stage sun gear teeth of the second stage sun gear 332, the planet gear teeth 412 are second stage planet gear teeth of the second stage planet gears 334, the ring gear teeth 414 are second stage ring gear teeth of the second stage ring gear 336, and the ring gear pitch radius $R_{ring}$ is the second stage ring gear pitch radius $R_{ring2}$.

Figure 5:
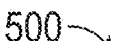
FIG. 5 is a schematic, cross-sectional view of a gearbox assembly for a turbofan engine, taken along a longitudinal centerline axis of the gearbox assembly, according to the present disclosure.
Figure 5:
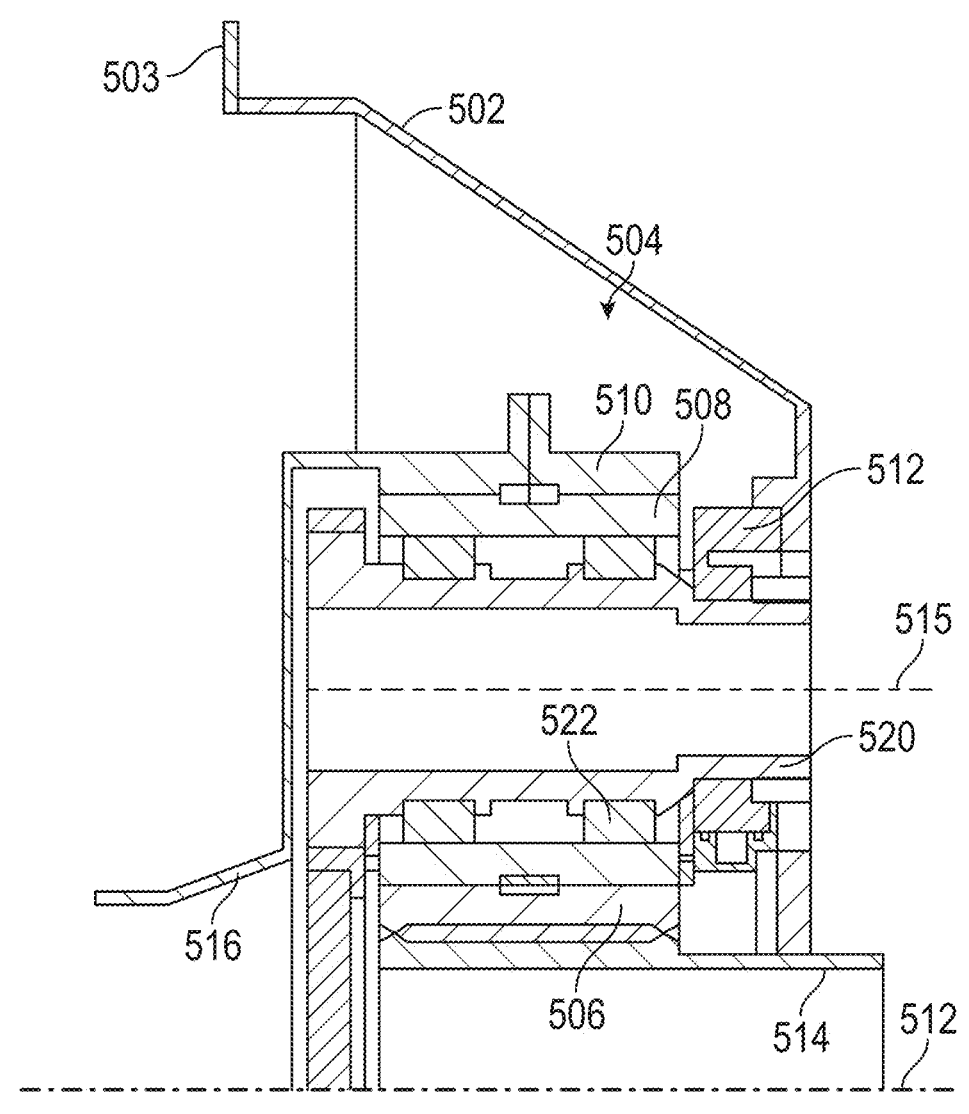

FIG. 5 is a schematic, cross-sectional view of a gearbox assembly 500, taken along the longitudinal centerline axis 212 of the gearbox assembly 500, according to the present disclosure. The gearbox assembly 500 can be utilized as the gearbox assembly 255 of the turbofan engine 210 of FIG. 2. In particular, the gearbox assembly 500 is utilized in the second turbofan engine 110*b* of FIG. 1 for rotating the second fan 152*b* in the second direction 113 (clockwise direction). The gearbox assembly 500 has a clockwise rotational output (e.g., the output of the gearbox assembly 500 rotates in the clockwise direction). The gearbox assembly 500 includes a gearbox casing 502 having a gearbox coupling 503 that couples the gearbox assembly 500 to a static structure of the turbofan engine (e.g., the fan frame 271). The gearbox coupling 503 is a flex mount that is a mounting structure that couples the gearbox assembly to the static structure of the turbofan engine.

The gearbox assembly 500 is a single gearbox assembly that includes a gear assembly 504. In this way, the gearbox assembly 500 is not a double gearbox assembly and does not include a second stage gear assembly. However, in some embodiments, the gearbox assembly 500 can also be a double gearbox assembly in which the first stage gear assembly is in a star configuration and the second stage gear assembly is a planet configuration such that the output of the gearbox assembly 500 rotates in the clockwise direction. The gear assembly 504 is contained within the gearbox casing 502. As detailed further below, the gear assembly 504 is an epicyclic gear assembly in a star configuration. In this way, the input of the gear assembly 504 rotates in the counterclockwise direction and the output of the gear assembly 504 rotates in the clockwise direction. The gearbox assembly 500 has a gear ratio in a range of 6:1 to 12:1.

With reference to FIG. 5, the gear assembly 504 is an epicyclic gear assembly and includes a sun gear 506, a plurality of planet gears 508 (only two of which are visible in FIG. 5), and a ring gear 510. For clarity, only a portion of the gears is shown. The sun gear 506 has a sun gear pitch radius. Each of the plurality of planet gears 508 has a planet gear pitch radius. The ring gear 510 has a ring gear pitch radius. The plurality of planet gears 508 is contained and supported by a planet carrier 512 (shown schematically in FIG. 5). The gear assembly 504 is a star configuration, in which the planet carrier 512 is held fixed, with the ring gear 510 allowed to rotate. For example, the planet carrier 512 is coupled to the gearbox casing 502 (which is coupled to the static structure of the turbofan engine).

The gearbox assembly 500 includes an input shaft 514 and an output shaft 516. In FIG. 5, the sun gear 506 is coupled to the input shaft 514. In some embodiments, the input shaft 514 and the sun gear 506 are a single unitary component. The input shaft 514 is coupled to the turbine section (FIG. 2) of the second turbofan engine 110*b* (FIG. 1). For example, the input shaft 514 can be coupled to, or can embody, the LP shaft 238 (FIG. 2). Radially outward of the sun gear 506, and intermeshing therewith, is the plurality of planet gears 508 that is coupled together and supported by the planet carrier 512. The planet carrier 512 supports the plurality of planet gears 508 such that the plurality of planet gears 508 is held fixed with respect to the longitudinal centerline axis 212, while enabling each planet gear 508 of the plurality of planet gears 508 to rotate about a planet gear longitudinal axis 515 of each planet gear 508. Radially outwardly of the plurality of planet gears 508, and intermeshing therewith, is the ring gear 510, which is an annular ring gear. In the star configuration, the output shaft 516 is driven by the ring gear 510. The output shaft 516 is an output of the gear assembly 504. The output shaft 516 is coupled to, or formed with, the fan shaft 256 (FIG. 2) of the second turbofan engine 110*b* (FIG. 1) such that rotation of the output shaft 516 causes the fan shaft 256 (and the second fan 152*b*) to rotate.

Each of the planet gears 508 includes a planet pin 520, about which a respective planet gear 508 rotates. For example, the planet pin 520 is disposed within a respective planet gear 508. Each of the planet gears 508 is supported by one or more roller bearings 522 disposed radially between the planet pin 520 and the planet gear 508. FIG. 5 shows the one or more roller bearings 522 include two roller bearings 522 that are spaced axially from each other. A respective planet gear 508, however, can include any number of roller bearings 522 for supporting rotation of the planet gear 508 about the planet pin 520. The second turbofan engine 110*b* (FIG. 1) can include a lubrication system that supplies a lubricant (e.g., oil) to the gear assembly 504 to lubricate the gears and the roller bearings 522.

In operation, the input shaft 514 (e.g., the LP shaft 238) rotates and transfers torque to the output shaft 516 through the gear assembly 504. In particular, the input shaft 514 transfers the torque to the sun gear 506, causing the sun gear 506 to rotate. The input shaft 514 and the sun gear 506 rotate in the counterclockwise direction. The sun gear 506 transfers the torque to the plurality of planet gears 508 and drives the plurality of planet gears 508 such that each planet gear 508 rotates about the planet gear longitudinal axis 515. The plurality of planet gears 508 rotates in the clockwise direction (e.g., in a direction opposite of the sun gear 506). The planet carrier 512 holds the plurality of planet gears 508 stationary with respect to the longitudinal centerline axis 212. The plurality of planet gears 508 transfers the torque to the ring gear 510 and drives the ring gear 510 such that the ring gear 510 rotates, thereby causing the output shaft 516 to rotate. The ring gear 510 (and the output shaft 516) rotates in the clockwise direction such that the ring gear 510 rotates in the same direction as that of the plurality of planet gears 508 and an opposite direction as that of the sun gear 506.

As mentioned earlier, the inventors sought to improve upon the size and the weight of a gearbox assembly, particularly, a double gearbox assembly considering a balance among the structural requirements, the assembly requirements, the reliability requirements, and the weight requirements for achieving a gear ratio for a particular power output and torque output for a turbofan engine. With regard to the sizing and the weight requirements, consideration was given not simply to those factors affecting the weight of the gearbox assembly such as the size of the gears or number of teeth of the gears, but also the loading environment including the power of the fan of the turbofan engine, the rotational speed of the LP shaft, and the number of LP turbine stages. In contrast to existing aircraft engines requiring a gearbox assembly (e.g., a gearbox that couples a LP shaft to the fan) that either utilizes a relatively low gear ratio or a lower power rating requirement on the gearbox, embodiments considered (high power rating and gear ratio) presented challenges in determining how the gearbox could be reduced in size and weight while still being capable of transferring torque with high efficiency, and to account for manufacturability (e.g., assembly), structural capabilities, and reliability in a reliable, repeatable, and accurate manner.

During the course of evaluating the different embodiments set forth herein, with the goal of improving upon the weight and the size (e.g., radial and axial) of the gearbox assembly to fit within the tight spaces of a turbofan engine while providing for a gear ratio for achieving a required power output and torque output for the turbofan engine, the inventors discovered, unexpectedly, that there exists a relationship among the number of LP turbine stages, the power of the fan, the rotational speed of the LP shaft, the number of planet gears of the gearbox assembly, the ring gear pitch radius $R_{ring}$, and the number of ring gear teeth of the ring gear capable of differentiating an architecture that satisfies the structural requirements, the assembly requirements, and the reliability requirements for achieving a gear ratio for a particular power output and torque output for a turbofan engine from an architecture that does not satisfy these requirements. This relationship moreover is capable of uniquely identifying a finite and a readily ascertainable number of embodiments suitable for a particular architecture that accounts for the size of the gearbox assembly to reduce the weight of the gearbox assembly while being capable of providing the gear ratio needed to achieve the required power output and torque output for the turbofan engine. The inventors submit that the relationship enables one to select a size and a weight for the gearbox assembly that can minimize the weight while still being capable of achieving the required power output and torque output needed for the turbofan engine. This relationship is referred to as a Double Gearbox Engine Parameter (DGEP), in relationship (1):

$$k \times S \times \sum_{i=1}^{2} \tag{1}$$

18

-continued $$\left( \frac{P_{fan} \times 10^6 \times z_i}{376 \times \omega_{ring\,i} \times n_{planetsi} \times R_{ring\,i}^2} \times \pi \times \frac{R_{ring\,i}^2}{z_i^2} \times (18.5 \times z_i + 85.5625) \right)$$

In the DGEP relationship, k is a constant value based on the number of planet gears (e.g., the first stage planet gears 308 or the second stage planet gears 334) of a gear assembly (e.g., the first stage gear assembly 304 or the second stage gear assembly 330) for the double gearbox assembly 300, S is the number of LP turbine stages 239 in the LP turbine 234, i is the first stage gear assembly 304 or the second stage gear assembly 330 of the double gearbox assembly 300, $P_{fan}$ is a power of the fan 252 of the turbofan engine 210 at high-power conditions (e.g., takeoff), $\omega_{ring\,i}$ is a rotational speed at high-power conditions (e.g., takeoff) of the first stage ring gear 310 when i is 1 or the second stage ring gear 336 when i is 2, $n_{planetsi}$ is the number of planet gears (e.g., the first stage planet gears 308 when i is 1 or the second stage planet gears 334 when i is 2), $R_{ring\,i}$ is the ring gear pitch radius of the first stage ring gear 310 when i is 1 or the second stage ring gear 336 when i is 2, $z_i$ is a number of the ring gear teeth 414 of the first stage ring gear 310 when i is 1 or the second stage ring gear 336 when i is 2, and $10^6$ is a constant to account for a conversion of kilowatts (KW) to Watts (W) for $P_{fan}$ and a conversion of millimeters (mm) to meters (m) for $R_{ring\,i}$.

For the double gearbox assembly 300, the summation is performed by first calculating the value using the parameters for the first stage gear assembly 304 (e.g., i=1), and then adding the value using the parameters for the second stage gear assembly 330 (e.g., i=2). Using this unique relationship, the weight of the gearbox assembly can be accurately estimated to minimize the weight of the gearbox assembly, while still fitting within the turbofan engine and providing the required power output and torque output needed for the turbofan engine.

The inventors also desired to arrive at design possibilities at an early stage of design, so that the downstream selection of candidate improved designs, given the tradeoffs, become more predictable. Without the DGEP relationship discovered by the inventors, the process has sometimes been more ad hoc, selecting one design or another without knowing the impact when a concept is first taken into consideration. For example, as mentioned above, the actual weight of the gearbox assembly may not be known until the gear sizes, the number of gear teeth, and other parameters have already been selected.

As discussed further below, the inventors identified a range for the DGEP that enables a gearbox assembly design for different turbofan engine architectures that accounts for the gear ratio needed to achieve the required power output and torque output needed for the turbofan engine, while reducing the size and the weight of the gearbox assembly. Gearbox assemblies that fall within this range provide for feasible architectures that have low weight while achieving the gear ratio for the required power output and torque output for a particular turbofan engine architecture. Gearbox assemblies that fall outside of this range are either too heavy or do not provide the gear ratio for meeting the required power output and torque output of the turbofan engine.

Table 1 represents exemplary embodiments 1 to 5 and their corresponding DGEP values for various turbofan engines and gearbox assemblies.

TABLE 1

| Emb. | k | S | $P_{fan}$ (kW) | $\omega_{ring\ 1}$ (rad/s) | $\omega_{ring\ 2}$ (rad/s) | $n_{planets}$ | $R_{ring\ 1}$ (mm) | $R_{ring\ 2}$ (mm) | $z_1$ | $z_2$ | DGEP (kg) |
|---|---|---|---|---|---|---|---|---|---|---|---|
| 1 | 1.59E– 05 | 4 | 14590 | 352 | 116 | 5 | 188 | 264 | 112 | 128 | 340 |
| 2 | 1.59E– 05 | 4 | 11816 | 373 | 117 | 5 | 172 | 240 | 98 | 137 | 268 |
| 3 | 1.59E– 05 | 4 | 12258 | 379 | 124 | 5 | 178 | 243 | 103 | 128 | 265 |
| 4 | 1.59E– 05 | 4 | 12970 | 328 | 103 | 5 | 183 | 260 | 98 | 137 | 335 |
| 5 | 1.59E– 05 | 4 | 12662 | 346 | 122 | 5 | 185 | 253 | 103 | 133 | 284 |

The DGEP is only valid for a double gearbox assembly 300. The DGEP can also be used for a gearbox assembly 500 having a single gear assembly 504 (e.g., without the summation). In the DGEP relationship, the constant k is $1.59 \times 10^{-5}$ for five planet gears on the first stage gear assembly and the second stage gear assembly. The constant k is $1.17 \times 10^{-5}$ for three planet gears on the first stage gear assembly and the second stage gear assembly.

The DGEP is only valid for a turbofan engine with an LP turbine having a number of LP turbine stages (S) in a range from two LP turbine stages to six LP turbine stages. In some embodiments, the number of LP turbine stages (S) is in a range from three LP turbine stages to five LP turbine stages. The estimated weight of the gearbox assembly provided by the DGEP increases as the number of LP turbine stages increases and decreases as the number of LP turbine stages decreases.

The DGEP is only valid for a power of the fan ($P_{fan}$) of the turbofan engine in a range from eleven thousand kilowatts (11,000 kW) to fifteen thousand kilowatts (15,000 kW). Such a range of $P_{fan}$ is achieved by the design of the double gearbox assembly 300 detailed herein. In particular, the double gearbox assembly 300 is designed as a double (e.g., two-stage) gearbox assembly having a gear ratio of 7:1 to 12:1, as detailed above, in order to achieve a fan power $P_{fan}$ in the range from eleven thousand kilowatts to fifteen thousand kilowatts. In this way, when the double gearbox assembly 300 is utilized in the first turbofan engine 110*a* (FIG. 1), the first turbofan engine 110*a* is capable of achieving the same fan power as the second turbofan engine 110*b* (FIG. 1) that utilizes the gearbox assembly 500 (FIG. 5), while allowing the first fan 152*a* (FIG. 1) to rotate counter to the second fan 152*b* (FIG. 1).

The DGEP is only valid for a rotational speed of the ring gear ($\omega_{ring}$) in a range from ninety-four radians per second (94 rad/s) to four hundred fifty radians per second (450 rad/s). Such a range of $\omega_{ring}$ is achieved by the design of the double gearbox assembly 300 detailed herein. In particular, the double gearbox assembly 300 is designed as a double (e.g., two-stage) gearbox assembly having a gear ratio of 7:1 to 12:1, as detailed above, in order to achieve a ring gear rotational speed $\omega_{ring}$ in the range from ninety-four radians per second to four hundred fifty radians per second. In this way, the when the double gearbox assembly 300 is utilized in the first turbofan engine 110*a* (FIG. 1), the first turbofan engine 110*a* is capable of achieving the same ring gear rotational speed as the second turbofan engine 110*b* (FIG. 1) that utilizes the gearbox assembly 500 (FIG. 5), while allowing the first fan 152*a* (FIG. 1) to rotate counter to the second fan 152*b* (FIG. 1).

The DGEP is only valid for a number of planet gears ($n_{planetsi}$) in a range from three planet gears to six planet gears. The number of planet gears is selected to provide the required gear ratio while also considering the limitations on design space for the planet carrier, the integration of the gearbox assembly in the turbine engine, and the minimizing the number of parts.

The DGEP is only valid for a ring gear pitch radius ($R_{ring\ i}$) in a range from one hundred fifty millimeters (150 mm) to three hundred millimeters (300 mm). The ring gear pitch radius is selected to provide the required gear ratio while being able to fit within the tight spaces of the turbofan engine, as described above.

The DGEP is valid for a number of ring gear teeth ($z_i$) in a range from eighty-nine (89) to one hundred fifty-one (151). The number of ring gear teeth $z_i$ is selected to ensure the ring gear (e.g., the first stage ring gear or the second stage ring gear) adequately transfers torque while reducing the size and the weight of the ring gear. In particular, the ring gear is smaller (e.g., has a lesser pitch radius) for values of the number of ring gear teeth $z_i$ closer to eighty-nine. The ring gear can better transfer torque for values of the number of ring gear teeth $z_i$ closer to one hundred fifty-one. For values less than eighty-nine, the sun gear requires a lesser number of sun gear teeth to compensate for the lesser number of ring gear teeth $z_i$, thus, the sun gear performance is reduced. For values greater than one hundred fifty-one, the ring gear is too large and too heavy to achieve the benefits detailed above.

Figure 6:
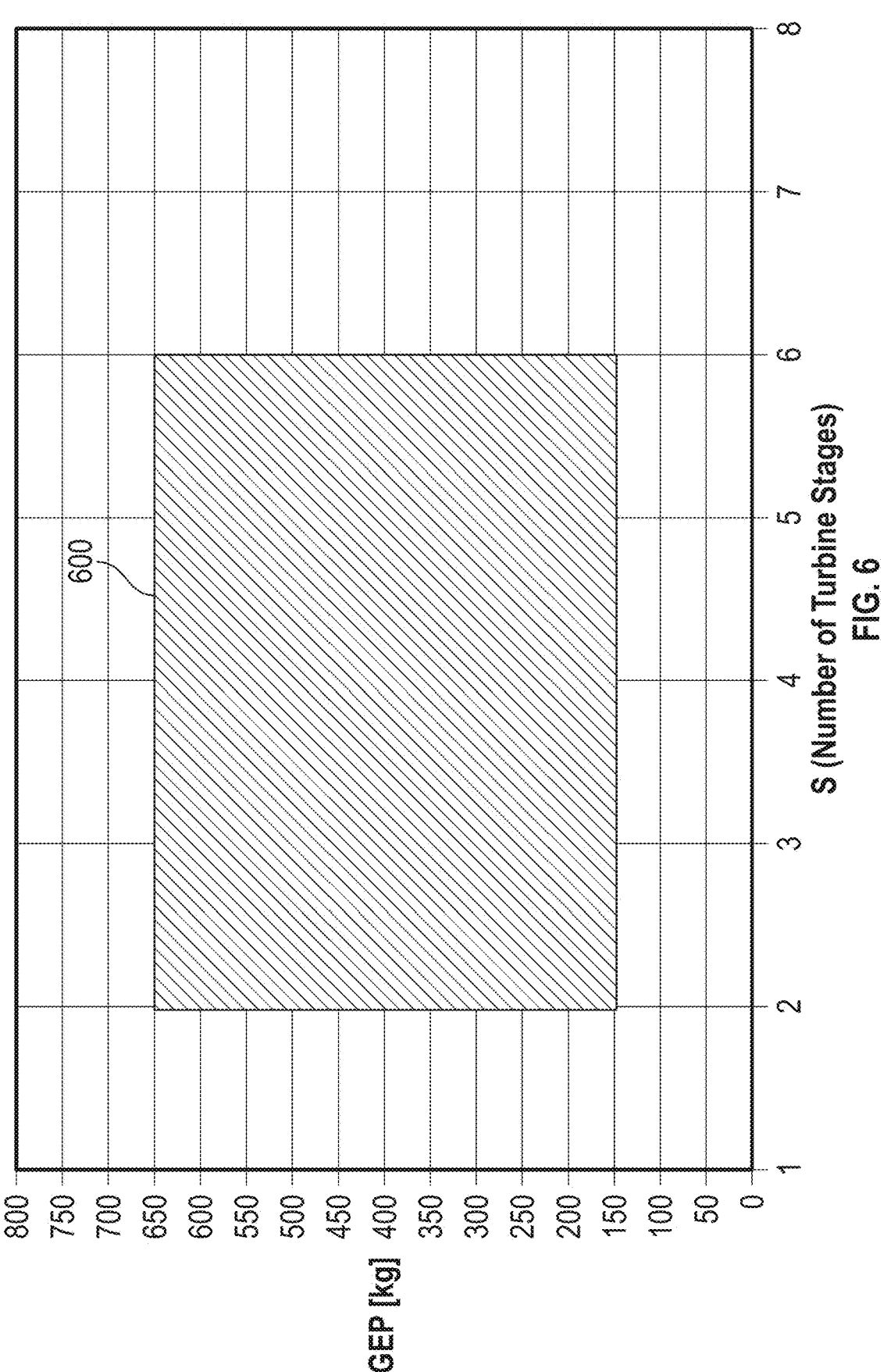
FIG. 6 represents, in graph form, a double gearbox engine parameter (DGEP) as a function of a number of turbine stages of the turbofan engine, according to the present disclosure.

FIG. 6 represents, in graph form, a double gearbox engine parameter (DGEP) as a function of a number of LP turbine stages (S) of the turbofan engine, according to the present disclosure. An area 600 represents the boundaries of DGEP. The DGEP is in a range from one hundred fifty kilograms to six hundred fifty kilograms (150 kg to 650 kg) for a number of LP turbine stages (S) in a range from two LP turbine stages to six LP turbine stages. Table 1 shows that the DGEP increases as the number of LP turbine stages increases. The area 600 identifies the specific architectures of the gearbox assembly needed to minimize the weight of the gearbox assembly, while providing the gear ratios required for achieving the power output and torque output of turbofan engines, particularly, open fan engines. In particular, gearbox assemblies that fall within the area 600 provide for feasible architectures that have low weight while achieving the gear ratio (e.g., 7:1 to 12:1) for the required power output and torque output for a particular turbofan engine architecture. Gearbox assemblies that fall outside of the area 600 are either too heavy or do not provide the gear ratio (e.g., less than 7:1) for meeting the required power output and torque output of the turbofan engine.

Figure 7:
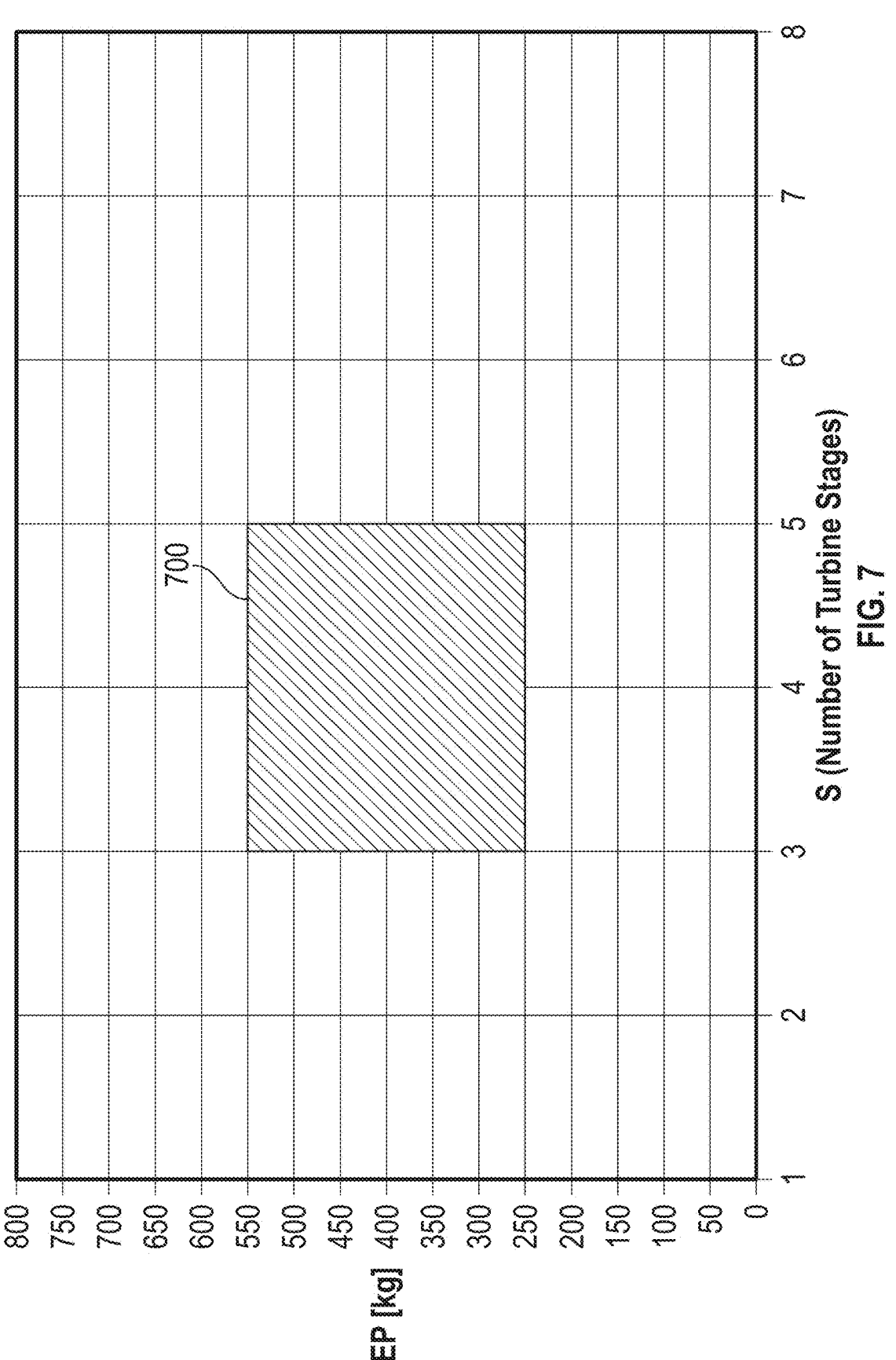
FIG. 7 represents, in graph form, a double gearbox engine parameter (DGEP) as a function of a number of turbine stages of the turbofan engine, according to another embodiment.

FIG. 7 represents, in graph form, a double gearbox engine parameter (DGEP) as a function of a number of LP turbine stages (S) of the turbofan engine, according to another embodiment. An area 700 represents the boundaries of DGEP. The DGEP is in a range from one hundred fifty kilograms to six hundred fifty kilograms (150 kg to 650 kg) for a number of LP turbine stages (S) in a range from two LP turbine stages to six LP turbine stages. Table 1 shows that the DGEP increases as the number of the LP turbine stages increases. The area 700 identifies the specific architectures of the gearbox assembly needed to minimize the weight of the gearbox assembly, while providing the gear ratios required for achieving the power output and the torque output of turbofan engines, particularly, open fan engines. In particular, gearbox assemblies that fall within the area 700 provide for feasible architectures that have a low weight, while achieving the gear ratio (e.g., 7:1 to 12:1) for the required power output and torque output for a particular turbofan engine architecture. Gearbox assemblies that fall outside of the area 700 are either too heavy or do not provide the gear ratio (e.g., less than 7:1) for meeting the required power output and torque output of the turbofan engine.

Further aspects are provided by the subject matter of the following clauses.

A turbofan engine comprises a turbo-engine including a compressor section, a turbine section, and a combustor in fluid communication with the compressor section and the turbine section, the turbine section including a low-pressure turbine having a low-pressure shaft and a plurality of low-pressure turbine stages, a fan having a fan shaft, and a double gearbox assembly, the fan shaft being drivingly coupled to the low-pressure shaft through the double gearbox assembly, the double gearbox assembly comprising a first stage gear assembly coupled to the low-pressure shaft, the first stage gear assembly including a first stage sun gear, a plurality of first stage planet gears meshing with the first stage sun gear, and a first stage ring gear having a plurality of ring gear teeth and meshing with the plurality of first stage planet gears, and an interstage shaft, and a second stage gear assembly coupled to the interstage shaft, the second stage gear assembly including a second stage sun gear, a plurality of second stage planet gears meshing with the second stage sun gear, and a second stage ring gear having a plurality of ring gear teeth and meshing with the plurality of second stage planet gears, and an output shaft coupled to the fan shaft, the double gearbox assembly being characterized by a Double Gearbox Engine Parameter (DGEP) in a range from 150 kilograms to 650 kilograms, the DGEP being given by:

$$k \times S \times \sum_{i=1}^{2} \left( \frac{P_{fan} \times 10^6 \times z_i}{376 \times \omega_{ring\,i} \times n_{planetsi} \times R_{ring\,i}{}^2} \times \pi \times \frac{R_{ring\,i}{}^2}{z_i{}^2} \times (18.5 \times z_i + 85.5625) \right)$$

k being a constant value based on a number of the plurality of first stage planet gears or the plurality of second stage planet gears, S is a number of the plurality of low-pressure turbine stages, i is the first stage gear assembly or the second stage gear assembly, $P_{fan}$ is a power of the fan at high-power conditions, $\omega_{ring\,i}$ is a rotational speed at high-power conditions of the first stage ring gear when i is 1 or the second stage ring gear when i is 2, $n_{planetsi}$ is a number of the plurality of first stage planet gears when i is 1 or the plurality of second stage planet gears when i is 2, $R_{ring\,i}$ is a ring gear pitch radius of the first stage ring gear when i is 1 or the second stage ring gear when i is 2, and $z_i$ is a number of the plurality of ring gear teeth of the first stage gear assembly when i is 1 or the second stage gear assembly when i is 2.

The turbofan engine of the preceding clause, DGEP being in a range from 250 to 550.

The turbofan engine of any preceding clause, k being $1.59 \times 10^{-5}$ when the number of the plurality of first stage planet gears and the plurality of second stage planet gears is 5, or $1.17 \times 10^{-5}$ when the number of the plurality of first stage planet gears and the plurality of second stage planet gears is 3.

The turbofan engine of any preceding clause, S being in a range from 2 to 6.

The turbofan engine of any preceding clause, S being in a range from 3 to 5.

The turbofan engine of any preceding clause, $P_{fan}$ being in a range from 11,000 kW to 15,000 kW.

The turbofan engine of any preceding clause, $\omega_{ring\,i}$ being in a range from 94 rad/s to 450 rad/s.

The turbofan engine of any preceding clause, $n_{planetsi}$ being in a range from 3 to 6.

The turbofan engine of any preceding clause, $R_{ring\,i}$ being in a range from 150 mm to 300 mm.

The turbofan engine of any preceding clause, $z_i$ being in a range from 89 to 151.

The turbofan engine of any preceding clause, the low-pressure shaft rotating in a counterclockwise direction and the fan shaft rotates in the counterclockwise direction such that the fan rotates in the counterclockwise direction.

An engine system for an aircraft comprises a first turbofan engine comprising a first turbo-engine including a compressor section, a turbine section, and a combustor in fluid communication with the compressor section and the turbine section, the turbine section including a low-pressure turbine having a first low-pressure shaft and a plurality of low-pressure turbine stages, a first fan having a first fan shaft, and a double gearbox assembly, the first fan shaft being drivingly coupled to the first low-pressure shaft through the double gearbox assembly, the first low-pressure shaft rotating in a counterclockwise direction and the first fan shaft rotates in the counterclockwise direction such that the first fan rotates in the counterclockwise direction, the double gearbox assembly comprising a first stage gear assembly coupled to the first low-pressure shaft, the first stage gear assembly including a first stage sun gear, a plurality of first stage planet gears meshing with the first stage sun gear, and a first stage ring gear having a plurality of ring gear teeth and meshing with the plurality of first stage planet gears, and an interstage shaft, and a second stage gear assembly coupled to the interstage shaft, the second stage gear assembly including a second stage sun gear, a plurality of second stage planet gears meshing with the second stage sun gear, and a second stage ring gear having a plurality of ring gear teeth and meshing with the plurality of second stage planet gears, and an output shaft coupled to the first fan shaft, the double gearbox assembly being characterized by a Double Gearbox Engine Parameter (DGEP) in a range from 150 to 650, the DGEP being given by:

$$k \times S \times \sum_{i=1}^{2}$$

$$\left( \frac{P_{fan} \times 10^6 \times z_i}{376 \times \omega_{ring\,i} \times n_{planetsi} \times R_{ring\,i}{}^2} \times \pi \times \frac{R_{ring\,i}{}^2}{z_i{}^2} \times (18.5 \times z_i + 85.5625) \right)$$

23 k being a constant value based on a number of the plurality of first stage planet gears or the plurality of second stage planet gears, S is a number of the plurality of low-pressure turbine stages of the low-pressure turbine, i is the first stage gear assembly or the second stage gear assembly, $P_{fan}$ is a power of the first fan at high-power conditions, $\omega_{ring\ i}$ is a rotational speed at high-power conditions of the first stage ring gear when i is 1 or the second stage ring gear when i is 2, $n_{planetsi}$ is a number of the plurality of first stage planet gears when i is 1 or the plurality of second stage planet gears when i is 2, $R_{ring\ i}$ is a ring gear pitch radius of the first stage ring gear when i is 1 or the second stage ring gear when i is 2, and $z_i$ is a number of the plurality of ring gear teeth of the first stage ring gear when i is 1 or the second stage ring gear when i is 2, and a second turbofan engine comprising a second turbo-engine including a compressor section, a turbine section, and a combustor in fluid communication with the compressor section and the turbine section, the turbine section including a second low-pressure shaft, a second fan having a second fan shaft, and a gearbox assembly comprising a gear assembly, the second fan shaft being drivingly coupled to the second low-pressure shaft through the gearbox assembly, the second low-pressure shaft rotating in the counterclockwise direction and the second fan shaft rotates in a clockwise direction such that the second fan rotates in the clockwise direction.

The engine system of any preceding clause, DGEP being in a range from 250 to 550.

The engine system of any preceding clause, k being $1.59\times10^{-5}$ when the number of the plurality of first stage planet gears and the plurality of second stage planet gears is 5, or $1.17\times10^{-5}$ when the number of the plurality of first stage planet gears and the plurality of second stage planet gears is 3.

The engine system of any preceding clause, S being in a range from 2 to 6.

The engine system of any preceding clause, $P_{fan}$ being in a range from 11,000 kW to 15,000 kW.

The engine system of any preceding clause, $\omega_{ring\ i}$ being in a range from 94 rad/s to 450 rad/s.

The engine system of any preceding clause, $n_{planetsi}$ being in a range from 3 to 6.

The engine system of any preceding clause, $R_{ring\ i}$ being in a range from 150 mm to 300 mm.

The engine system of any preceding clause, $z_i$ being in a range from 89 to 151.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A turbofan engine comprising:
a turbo-engine including a compressor section, a turbine section, and a combustor in fluid communication with the compressor section and the turbine section, the turbine section including a low-pressure turbine having a low-pressure shaft and a plurality of low-pressure turbine stages;
a fan having a fan shaft; and

24 a double gearbox assembly, the fan shaft being drivingly coupled to the low-pressure shaft through the double gearbox assembly, the double gearbox assembly comprising:
a first stage gear assembly coupled to the low-pressure shaft, the first stage gear assembly including a first stage sun gear, a plurality of first stage planet gears meshing with the first stage sun gear, and a first stage ring gear having a plurality of ring gear teeth and meshing with the plurality of first stage planet gears, and an interstage shaft; and
a second stage gear assembly coupled to the interstage shaft, the second stage gear assembly including a second stage sun gear, a plurality of second stage planet gears meshing with the second stage sun gear, and a second stage ring gear having a plurality of ring gear teeth and meshing with the plurality of second stage planet gears, and an output shaft coupled to the fan shaft,
wherein the double gearbox assembly is characterized by a Double Gearbox Engine Parameter (DGEP) in a range from 150 kilograms to 650 kilograms, the DGEP being given by:

$$k \times S \times$$
$$\sum_{i=1}^{2}\left(\frac{P_{fan} \times 10^6 \times z_i}{376 \times \omega_{ring\ i} \times n_{planetsi} \times R_{ring\ i}^2} \times \pi \times \frac{R_{ring\ i}^2}{z_i^2} \times (18.5 \times z_i + 85.5625)\right)$$

wherein k is a constant value based on a number of the plurality of first stage planet gears or the plurality of second stage planet gears, S is a number of the plurality of low-pressure turbine stages, i is the first stage gear assembly or the second stage gear assembly, $P_{fan}$ is a power of the fan at high-power conditions, $\omega_{ring\ i}$ is a rotational speed at high-power conditions of the first stage ring gear when i is 1 or the second stage ring gear when i is 2, $n_{planetsi}$ is a number of the plurality of first stage planet gears when i is 1 or the plurality of second stage planet gears when i is 2, $R_{ring\ i}$ is a ring gear pitch radius of the first stage ring gear when i is 1 or the second stage ring gear when i is 2, and $z_i$ is a number of the plurality of ring gear teeth of the first stage gear assembly when i is 1 or the second stage gear assembly when i is 2.

2. The turbofan engine of claim 1, wherein DGEP is in a range from 250 kilograms to 550 kilograms.

3. The turbofan engine of claim 1, wherein k is $1.59\times10^{-5}$ when the number of the plurality of first stage planet gears and the plurality of second stage planet gears is 5, or $1.17\times10^{-5}$ when the number of the plurality of first stage planet gears and the plurality of second stage planet gears is 3.

4. The turbofan engine of claim 1, wherein S is in a range from 2 to 6.

5. The turbofan engine of claim 1, wherein S is in a range from 3 to 5.

6. The turbofan engine of claim 1, wherein $P_{fan}$ is in a range from 11,000 kW to 15,000 kW.

7. The turbofan engine of claim 1, wherein $\omega_{ring\ i}$ is in a range from 94 rad/s to 450 rad/s.

8. The turbofan engine of claim 1, wherein $n_{planetsi}$ is in a range from 3 to 6.

9. The turbofan engine of claim 1, wherein $R_{ring\ i}$ is in a range from 150 mm to 300 mm.

10. The turbofan engine of claim 1, wherein $z_i$ is in a range from 89 to 151.

11. The turbofan engine of claim 1, wherein the low-pressure shaft rotates in a counterclockwise direction and the fan shaft rotates in the counterclockwise direction such that the fan rotates in the counterclockwise direction.

12. An engine system for an aircraft, the engine system comprising:

a first turbofan engine comprising:

a first turbo-engine including a compressor section, a turbine section, and a combustor in fluid communication with the compressor section and the turbine section, the turbine section including a low-pressure turbine having a first low-pressure shaft and a plurality of low-pressure turbine stages;

a first fan having a first fan shaft; and a double gearbox assembly, the first fan shaft being drivingly coupled to the first low-pressure shaft through the double gearbox assembly, wherein the first low-pressure shaft rotates in a counterclockwise direction and the first fan shaft rotates in the counterclockwise direction such that the first fan rotates in the counterclockwise direction, the double gearbox assembly comprising:

a first stage gear assembly coupled to the first low-pressure shaft, the first stage gear assembly including a first stage sun gear, a plurality of first stage planet gears meshing with the first stage sun gear, and a first stage ring gear having a plurality of ring gear teeth and meshing with the plurality of first stage planet gears, and an interstage shaft; and a second stage gear assembly coupled to the interstage shaft, the second stage gear assembly including a second stage sun gear, a plurality of second stage planet gears meshing with the second stage sun gear, and a second stage ring gear having a plurality of ring gear teeth and meshing with the plurality of second stage planet gears, and an output shaft coupled to the first fan shaft, wherein the double gearbox assembly is characterized by a Double Gearbox Engine Parameter (DGEP) in a range from 150 kilograms to 650 kilograms, the DGEP being given by:

$$k \times S \times \sum_{i=1}^{2}$$

$$\left( \frac{P_{fan} \times 10^6 \times z_i}{376 \times \omega_{ring\,i} \times n_{planetsi} \times R_{ring\,i}^2} \times \pi \times \frac{R_{ring\,i}^2}{z_i^2} \times (18.5 \times z_i + 85.5625) \right)$$

wherein k is a constant value based on a number of the plurality of first stage planet gears or the plurality of second stage planet gears, S is a number of the plurality of low-pressure turbine stages of the low-pressure turbine, i is the first stage gear assembly or the second stage gear assembly, $P_{fan}$ is a power of the first fan at high-power conditions, $\omega_{ring\,i}$ is a rotational speed at high-power conditions of the first stage ring gear when i is 1 or the second stage ring gear when i is 2, $n_{planetsi}$ is a number of the plurality of first stage planet gears when i is 1 or the plurality of second stage planet gears when i is 2, $R_{ring\,i}$ is a ring gear pitch radius of the first stage ring gear when i is 1 or the second stage ring gear when i is 2, and $z_i$ is a number of the plurality of ring gear teeth of the first stage ring gear when i is 1 or the second stage ring gear when i is 2; and a second turbofan engine comprising:

a second turbo-engine including a compressor section, a turbine section, and a combustor in fluid communication with the compressor section and the turbine section, the turbine section including a second low-pressure shaft;

a second fan having a second fan shaft; and a gearbox assembly comprising a gear assembly, the second fan shaft being drivingly coupled to the second low-pressure shaft through the gearbox assembly, wherein the second low-pressure shaft rotates in the counterclockwise direction and the second fan shaft rotates in a clockwise direction such that the second fan rotates in the clockwise direction.

13. The engine system of claim 12, wherein DGEP is in a range from 250 kilograms to 550 kilograms.

14. The engine system of claim 12, wherein k is $1.59 \times 10^{-5}$ when the number of the plurality of first stage planet gears and the plurality of second stage planet gears is 5, or $1.17 \times 10^{-5}$ when the number of the plurality of first stage planet gears and the plurality of second stage planet gears is 3.

15. The engine system of claim 12, wherein S is in a range from 2 to 6.

16. The engine system of claim 12, wherein $P_{fan}$ is in a range from 11,000 kW to 15,000 kW.

17. The engine system of claim 12, wherein $\omega_{ring\,i}$ is in a range from 94 rad/s to 450 rad/s.

18. The engine system of claim 12, wherein $n_{planetsi}$ is in a range from 3 to 6.

19. The engine system of claim 12, wherein $R_{ring\,i}$ is in a range from 150 mm to 300 mm.

20. The engine system of claim 12, wherein $z_i$ is in a range from 89 to 151.

* * * * *